United States Patent
Akella

(10) Patent No.: US 12,093,238 B2
(45) Date of Patent: Sep. 17, 2024

(54) TRANSACTIONALLY CONSISTENT DATABASE EXPORTS

(71) Applicant: Rubrik, Inc., Palo Alto, CA (US)

(72) Inventor: Kalyan Chakravarthy Akella, Bengaluru (IN)

(73) Assignee: Rubrik, Inc., Palo Alto, CA (US)

( * ) Notice: Subject to any disclaimer, the term of this patent is extended or adjusted under 35 U.S.C. 154(b) by 368 days.

(21) Appl. No.: 17/705,848

(22) Filed: Mar. 28, 2022

(65) Prior Publication Data
US 2023/0306014 A1    Sep. 28, 2023

(51) Int. Cl.
*G06F 16/23*    (2019.01)

(52) U.S. Cl.
CPC ...... *G06F 16/2358* (2019.01); *G06F 16/2365* (2019.01); *G06F 16/2379* (2019.01)

(58) Field of Classification Search
None
See application file for complete search history.

(56) References Cited

U.S. PATENT DOCUMENTS

| | | | |
|---|---|---|---|
| 6,980,988 B1 * | 12/2005 | Demers | G06F 11/2082 |
| 11,010,267 B2 * | 5/2021 | Neall | G06F 11/2048 |
| 11,249,983 B2 * | 2/2022 | Kumar | G06F 16/27 |
| 2002/0103816 A1 * | 8/2002 | Ganesh | G06F 11/1464 |
| | | | 714/E11.12 |
| 2015/0317212 A1 * | 11/2015 | Lee | G06F 11/1458 |
| | | | 707/685 |
| 2023/0229670 A1 * | 7/2023 | Ranjan | G06F 16/2365 |
| | | | 707/615 |

OTHER PUBLICATIONS

Azure-DB-Support-Team, "Editing a .bacpac file", Microsoft Community Hub, blog post published Mar. 13, 2019, 10 pages. (Year: 2019).*

* cited by examiner

*Primary Examiner* — Scott A. Waldron
(74) *Attorney, Agent, or Firm* — Holland & Hart LLP

(57) ABSTRACT

Techniques for data management are described. A file may be saved that includes a representation of an exported database, where the representation may be based on a live database being exported from a computing system via an export operation that spans a time period. A determination that one or more transactions were committed to the live database during the time period may be made. Based on the determination, a log indicating the one or more transactions may be obtained from the computing system. Based on the log, a determination of whether the exported database captured the one or more transactions may be made. Based on the determination, the file may be updated to represent an updated database that reflects an updated version of the live database, the updated version of the live database reflection application of the one or more transactions to the exported database.

20 Claims, 9 Drawing Sheets

TRANSACTIONALLY CONSISTENT DATABASE EXPORTS

FIELD OF TECHNOLOGY

The present disclosure relates generally to database systems and data processing, and more specifically to transactionally consistent database exports.

BACKGROUND

A computing system may be employed to manage, process, backup, and restore data using a network of computing devices.

Cloud providers may support multiple types of storage for varying customer needs. Software may be built to store data in a file system format and use disk-based data storage on cloud instances. However, disk-based data storage may suffer from issues of durability, reliability, and scalability. Some cloud providers may support immutable data storage, data storage with versioning, or both. Techniques for backing up data in cloud providers may be improved.

DETAILED DESCRIPTION

Data in a transactionally consistent database may ensure data reliability. To maintain transactional consistency, a transaction applied to a database may not be committed to the database until the transaction is completed. Thus, the effect of transactions that are only partially applied to a database may be reverted from the database as if the transaction had never been applied. In some examples, a database that is available for use at a computing system (which may be referred to as a "live database") may be exported to another computing system—e.g., as part of a backup operation.

Directly exporting a live database to another computing system may result in an exported database that lacks transactional consistency being stored at the other computing system—e.g., if a transaction is partially applied to the live database during the export operation. To ensure that an exported database is transactionally consistent (e.g., to ensure that the exported database does not include any transactions partially applied to the live database during the export operation), a computing system may generate, at the computing system, a transactionally consistent copy of a live database and then export this database copy to the backup file. However, creating a transactionally consistent copy may increase the latency associated with generating the backup file and may utilize an undesirable amount of processing resources at the database computing system.

To enable a live database to be exported with reduced latency and less processing while maintaining transactional consistency for an exported database, change records may be used to bring transactional consistency to the exported database. Change records may indicate a state of a database (or data structure of a database) before and after a transaction is performed as well as an indication of the constituent operations of the transaction. The change records may provide information regarding one or more transactions performed while the export is ongoing and may be used to determine whether the exported database reflects such transactions. Additionally, the change records may be used to identify and apply unapplied and partially applied transactions to the exported database.

Aspects of the disclosure are initially described in the context of computing environments. Aspects of the disclosure are also described with reference to flowcharts and a chained transaction. Aspects of the disclosure are further illustrated by and described with reference to apparatus diagrams, system diagrams, and flowcharts that relate to transactionally consistent database exports.

Figure 1:
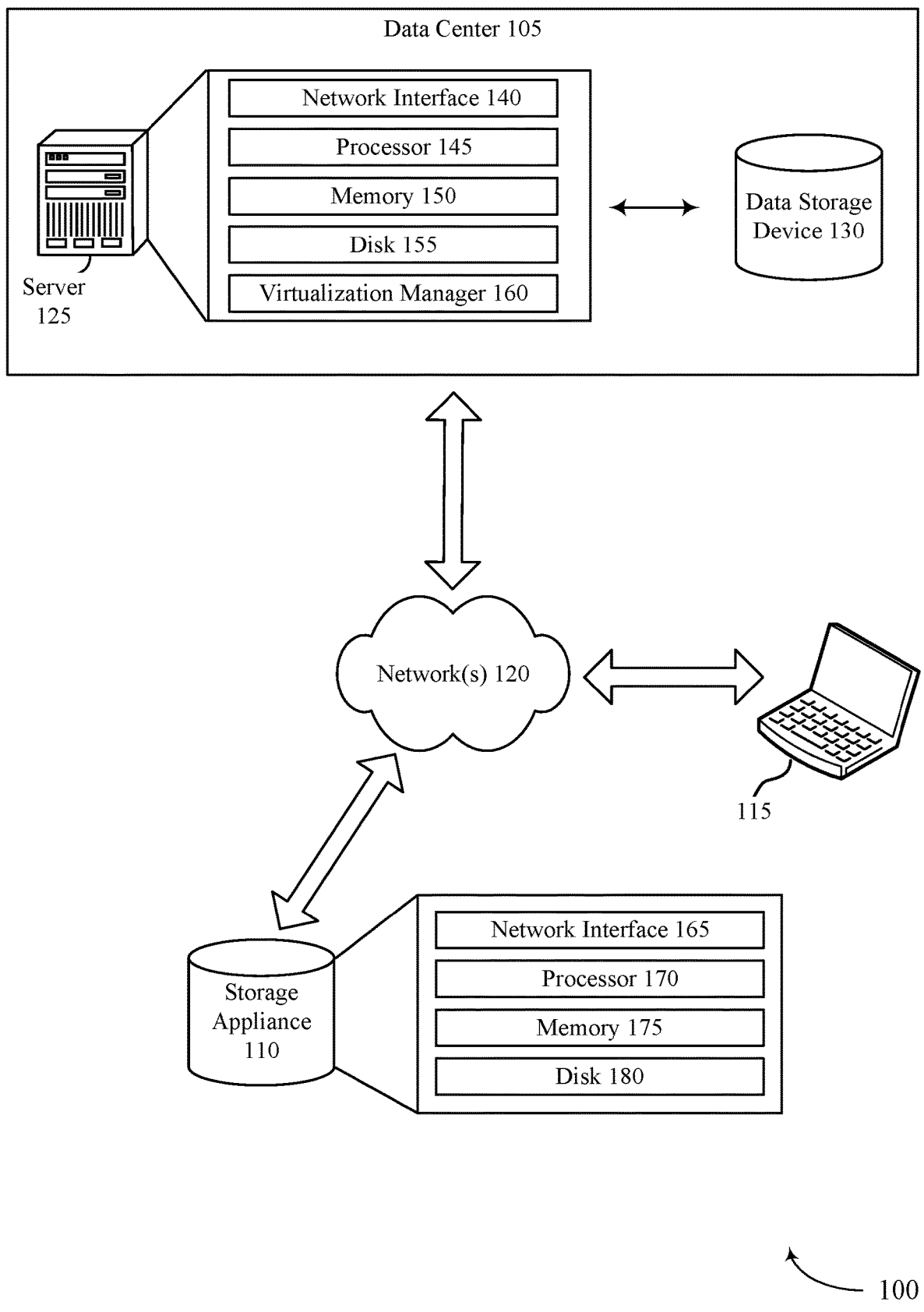
FIG. 1 illustrates an example of a computing environment for cloud computing that supports transactionally consistent database exports in accordance with examples disclosed herein.

FIG. 1 illustrates an example of a computing environment for cloud computing that supports transactionally consistent database exports in accordance with examples disclosed herein.

The computing environment 100 may include a data center 105, a storage appliance 110, and a computing device 115 in communication with each other via one or more networks 120. The computing environment 100 may also include one or more computing devices interconnected through one or more networks 120. In some examples, the computing environment 100 may include other computing devices or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The computing environment 100 may provide a cloud computing environment for one or more computing devices. Cloud computing may refer to Internet-based computing, wherein shared resources, software, and/or information may be provided to one or more computing devices on-demand via the Internet. The computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one example, the computing environment 100 may include a virtualized infrastructure that provides software, data processing, and/or data storage services to end users accessing the services via the computing environment 100. In one example, computing environment 100 may provide cloud-based work productivity or business-related applications to a computing device, such as computing device 115.

In some examples, the computing environment 100 may provide remote access to secure applications and files stored within data center 105 from a remote computing device, such as computing device 115. The data center 105 may use an access control application to manage remote access to protected resources, such as protected applications, databases, or files located within the data center 105. To facilitate remote access to secure applications and files, a secure network connection may be established using a virtual private network (VPN). A VPN connection may allow a remote computing device, such as computing device 115, to securely access data from a private network (e.g., from a company file server or mail server) using an unsecure public network or the Internet. The VPN connection may use client-side software (e.g., running on the remote computing device) to establish and maintain the VPN connection. The VPN client software may provide data encryption and encapsulation prior to the transmission of secure private network traffic through the Internet.

The computing device 115 may be a personal computing device, such as a stationary device (e.g., a desktop computer or access point) or a mobile device (e.g., a cellular phone, laptop, table, personal digital assistant). The computing device 115 may be a commercial computing device, such as a server or collection of servers. The computing device may be a virtual device, e.g., a virtual machine.

The data center 105 may include one or more servers, such as server 125, and one or more storage devices, such as storage device 130, that are in communication with the one or mor servers.

A server, such as server 125, may allow a client to download information or files (e.g., executable, text, application, audio, image, or video files) from the server 125 or to perform a search query related to particular information stored on the server 125. In some examples, a server may act as an application server or a file server. In general, server 125 may refer to a hardware device that acts as the host in a client-server relationship or a software process that shares a resource with or performs work for one or more clients. In some examples, the server 125 may be used to create and manage one or more virtual machines associated with a virtualized infrastructure. The one or more virtual machines may run various applications, such as a database application or a web server. The server 125 may include a network interface 140, processor 145, memory 150, disk 155, and virtualization manager 160 all in communication with each other.

Network interface 140 may enable server 125 to connect to one or more networks 120. Network interface 140 may include a wireless network interface and/or a wired network interface. Processor 145 may enable server 125 to execute computer-readable instructions stored in memory 150 in order to perform processes described herein. Processor 145 may include one or more processing units, such as one or more CPUs and/or one or more GPUs. Memory 150 may comprise one or more types of memory (e.g., RAM, SRAM, DRAM, ROM, EEPROM, Flash, etc.). Disk 155 may include a hard disk drive and/or a solid-state drive. Memory 150 and disk 155 may comprise hardware storage devices.

The virtualization manager 160 may manage a virtualized infrastructure and perform management operations associated with the virtualized infrastructure. The virtualization manager 160 may manage the provisioning of virtual machines running within the virtualized infrastructure and provide an interface to computing devices interacting with the virtualized infrastructure. In one example, the virtualization manager 160 may set a virtual machine having a virtual disk into a frozen state in response to a snapshot request made via an application programming interface (API) by a storage appliance, such as a storage appliance within data center 105 or storage appliance 110. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 160 may then transfer data associated with the virtual machine (e.g., an image of the virtual machine or a portion of the image of the virtual disk file associated with the state of the virtual disk at the point in time it is frozen) to a storage appliance (for example, a storage appliance within data center 105 or storage appliance 110 of FIG. 1, described further below) in response to a request made by the storage appliance. After the data associated with the point in time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 160 may perform various virtual machine-related tasks, such as cloning virtual machines, creating new virtual machines, monitoring the state of virtual machines, moving virtual machines between physical hosts for load balancing purposes, and facilitating backups of virtual machines.

The storage device 130 may include one or more hardware storage devices for storing data, such as a hard disk drive (HDD), a magnetic tape drive, a solid-state drive (SSD), a storage area network (SAN) storage device, or a Network-Attached Storage (NAS) device. In some cases, a data center, such as data center 105, may include multiple servers and/or data storage devices in communication with each other. The one or more data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

In some examples, the data center 105 includes a storage appliance (e.g., the storage appliance 110) that includes a data management system for backing up virtual machines or files within a virtualized infrastructure. A storage appliance within data center may be configured similar to storage appliance 110. In some examples, a storage appliance in data center is an extension of storage appliance 110. For example, a storage appliance in data center may be an agent for storage appliance 110, where the agent may be implemented as software (e.g., installed at server 125 or at a central server) or as hardware in data center 105. When implemented as hardware, the server 125 and storage appliance may be in communication with each other via a networking fabric connecting servers and data storage units within the data center 105 to each other.

The one or more networks 120 may allow computing devices or storage devices to connect to and communicate with other computing devices or other storage devices in computing environment 100. The one or more networks 120 may include a secure network such as an enterprise private network, an unsecure network such as a wireless open network, a local area network (LAN), a wide area network (WAN), and the Internet. The one or more networks 120 may include a cellular network, a mobile network, a wireless network, or a wired network. Each network of the one or more networks 120 may include hubs, bridges, routers, switches, and wired transmission media such as a direct-wired connection. The one or more networks 120 may include an extranet or other private network for securely sharing information or providing controlled access to applications or files.

The storage appliance 110 may comprise a cloud-based data management system for backing up virtual machines and/or files within a virtualized infrastructure, such as virtual machines running on server 125 or files stored on server 125. The storage appliance 110 may include multiple machines, and the multiple machines may comprise multiple nodes of a server cluster. The server cluster may comprise a set of physical machines that are connected together via a network. The server cluster may be used for storing data associated with a plurality of virtual machines, such as backup data associated with different point-in-time versions of the virtual machines. The storage appliance may include a network interface 165, processor 170, memory 175, and disk 180, which may be configured similarly as the corresponding components of server 125.

In some examples, the storage appliance 110 may manage the extraction and storage of virtual machine snapshots associated with different point in time versions of one or more virtual machines running within the data center 105. A snapshot of a virtual machine may correspond with a state of the virtual machine at a particular point-in-time. In response to a restore command from the storage device 130, the storage appliance 110 may restore a point-in-time version of a virtual machine or restore point-in-time versions of one or more files located on the virtual machine and transmit the restored data to the server 125. In response to a mount command from the server 125, the storage appliance 110 may allow a point-in-time version of a virtual machine to be mounted and allow the server 125 to read and/or modify data associated with the point-in-time version of the virtual machine. To improve storage density, the storage appliance 110 may deduplicate and compress data associated with different versions of a virtual machine and/or deduplicate and compress data associated with different virtual machines. To improve system performance, the storage appliance 110 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 110 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 110 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 110 may run a Network File System (NFS) server and make the particular version (or a copy of the particular version) of the virtual machine accessible for reading and/or writing. The end user of the storage appliance 110 may then select the particular version to be mounted and run an application (e.g., a data analytics application) using the mounted version of the virtual machine. In another example, the particular version may be mounted as an Internet Small Computer Systems Interface (iSCSI) target.

In some examples, storage appliance 110 is located within data center 105. In some examples, a storage appliance within data center 105 may similarly perform (e.g., instead of or in combination with storage appliance 110) the operations and functions described with reference to storage appliance 110.

A backup service (e.g., managed by storage appliance 110) may be configured to back up a database stored on a computing system (e.g., computing device 115 or server 125). The database may be a structured query language (SQL) database (e.g., a Microsoft SQL Server database). To back up a database, the computing system storing the database may initiate a process for exporting the database to the backup service as a backup file—e.g., in response to a trigger received from the backup service. In some examples, the database is exported as multiple bulk copy program (BCP) files (e.g., for exporting a Microsoft SQL Server database), usually one file per database table, in accordance with the BCP format. In other examples, the database is exported as a single backup package (BACPAC) file in accordance with the BACPAC format (e.g., for exporting a Microsoft SQL Server database). A BACPAC file is a ZIP file that contains the database schema along with the actual data stored within all the tables of a database. The schema of the database may be captured in extensible markup language (XML) files and the data of the database may be captured in or more BCP files per table in the database. The BCP files may be organized based on an index of a table. The backup service may store the exported database—e.g., at storage appliance 110.

In some examples, the computing system exporting the database may implement measures to ensure that the exported database stored at the computing system is transactionally consistent. Transactional consistency is a database property that is intended to guarantee data validity for data in the database in the face of data failures (e.g., unexpected power loss, system crashes, etc.). Transactional consistency requires that all operations included in a transaction be completed before the transaction is committed to the database. Thus, if some operations of a transaction are not completed, the transaction will not be committed to the database, and any changes made in connection with any completed operation of the incomplete transaction will be rolled back. Accordingly, a database that saves or otherwise reflects a partially completed transaction—that is, saves or otherwise reflects one or more completed operations of a transaction for which not all constituent operations were completed—may be considered transactionally inconsistent.

The possibility of exporting a transactionally inconsistent database may increase if the computing system is exporting a live database, where a live database may be a database that is available for updates while the export operation is ongoing. That is, for a live database, a user may initiate a transaction involving multiple operations on various tables for the database while the database is being exported. To export the live database, an export utility may scan the live database, only reading committed table data and ignoring data that is being written to, deleted from, or updated at the live database. That is, the export utility may scan the live database at a read-committed isolation level. In some examples, the live database may be a Microsoft SQL database, an Oracle SQL database, a MySQL database, etc.

Accordingly, during an export procedure, a table of the database may be scanned for export before a transaction that affects the table has begun (e.g., before a first operation of the transaction is executed) and a subsequent scan on a different table which is also affected by this transaction but after the transaction is complete (e.g., after the last operation of the transaction is executed, and thus after the transaction is committed to the database). Hence, the export operation may not consider the effects of the transaction during its scan on the first table, but the export operation may consider the effects of the transaction during the scan on the second table, thus partially exporting the changes of the transaction. In such cases, the exported database may reflect a partially performed transaction.

Accordingly, directly exporting a live database to another computing system may result in an exported database that lacks transactional consistency being stored at the other computing system—e.g., if a transaction is partially applied to the live database during the export operation. To ensure that an exported database is transactionally consistent (e.g., to ensure that the exported database does not include any transactions partially applied to the live database during the export operation), a computing system may generate, at the computing system, a file storing a transactionally consistent copy of a live database and then export the transactionally consistent copy to the backup file. However, creating a transactionally consistent copy may increase the latency associated with generating the backup file and may utilize an undesirable amount of processing resources at the database computing system.

To enable a live database to be exported with reduced latency and less processing while maintaining transactional consistency for an exported database, change records may be used to bring transactional consistency to the exported database. Change records may indicate a state of a database (or data structure of a database) before and after a transaction is performed as well as an indication of the constituent operations of the transaction. The change records may provide information regarding one or more transactions performed while the export is ongoing and may be used to determine whether the exported database reflects such transactions. Additionally, the change records may be used to identify and apply unapplied and partially applied transactions to the exported database. In some examples, the techniques described herein may be used for databases that are capable of exporting schema and data from the database to a file while an ongoing transaction is being applied to the database, as well as being capable of providing log offsets that indicate transaction log data (e.g., a Microsoft SQL Server database and its managed offerings on the Azure cloud).

In some examples, storage appliance 110 may be configured to save a file (e.g., a BACPAC file) containing an exported version of a database maintained at server 125 (which may be referred to as a live database), where server 125 may be configured to export the live database to storage appliance 110. Exporting the live database to storage appliance 110 may take an amount of time to complete, where the amount of time may be based on a size of the database, a quantity of tables in the database, or the like. The storage appliance 110 may also be configured to determine that one or more transactions were committed to the live database while the export operation was ongoing. Based on determining that one or more transactions were committed to the live database during the export operation, the storage appliance 110 may be configured to obtain a log that indicates the one or more transactions, where the log may be referred to as a change log. In some examples, the log indicates one or more operations used to perform the one or more transactions. Based on the change log, the storage appliance 110 may determine whether the exported version of the live database captured the one or more transactions committed to the live database during the export operation. Based on determining that the exported version of the live database missed at least a portion of the one or more transactions, the storage appliance 110 may update the file containing the exported version of the live database. After updating the file, the file may include an updated database, the updated database may reflect a version of the live database that exists at the end of the export operation. The updated database may also reflect an application of the one or more transactions to the exported database. In some examples, the updated database is referred to as an updated version of the exported database. Updating the file may include updating (e.g., modifying, adding, or deleting) one or more files (e.g., BCP files) within the file.

By using a change log to update a file containing an exported version of a live database so that the exported version of the live database will reflect one or more transactions committed to the live database during an export operation, transactional consistency may be brought to the exported version of the live database. Additionally, a transactionally consistent version of a live database may be exported without a database server first making an internal copy of the live database before exporting the internal copy; thus, the live database may be exported with reduced latency associated with exporting transactionally consistent versions of a live database.

Figure 2A:
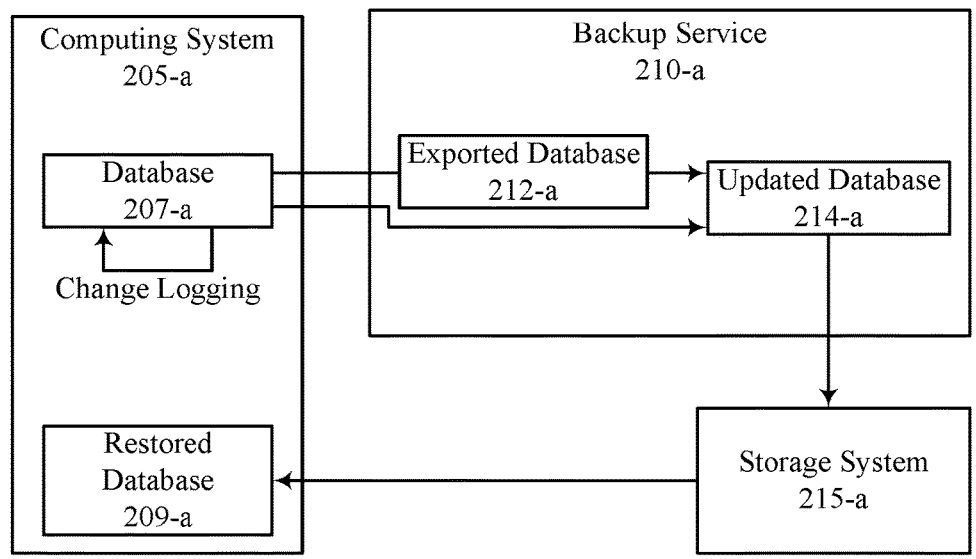
FIG. 2A illustrates an example subsystem that supports transactionally consistent database exports in accordance with examples as disclosed herein.

FIG. 2A illustrates an example subsystem that supports transactionally consistent database exports in accordance with examples as disclosed herein.

Subsystem 200-a depicts a computing subsystem. Subsystem 200-a may include computing system 205-a, backup service 210-a, and storage system 215-a.

Computing system 205-a may be configured to host a database, store files, run applications, run virtual machines, or any combination thereof. Computing system 205-a may be one or more servers (e.g., database servers), one or more devices, one or more virtual machines, or the like. In some cases, computing system 205-a may be located or implemented within server 125 of FIG. 1, or elsewhere within data center 105.

Computing system 205-a may include or host one or more databases, such as database 207-a. Database 207-a may include one or more tables, where entries in a table may be based on other entries in the table and other entries in other tables. Computing system 205-a may also include restored database 209-a in addition to or in place of database 207-a. Restored database 209-a may reflect a version of database 207-a at an earlier point in time. In some examples, computing system 205-a retrieves restored database 209-a from storage system 215-a—e.g., in response to a user command.

Computing system 205-a may be configured to operate database 207-a. Operating database 207-a may include committing transactions to the database. A transaction may be an update (e.g., a user or rule-initiated change) to database 207-a, where one or more operations may be used to complete the transaction. The one or more operations may affect one or more entries in a table of database 207-a, one or more tables in database 207-a, or both. Once the transaction is completed, the transaction may be "committed" to indicate that the transaction was successfully completed—e.g., that all of the operations were performed. If, for some reason, all of the operations are not performed (e.g., due to sudden power loss, read/write errors, network interruption, etc.), the effect of a subset of the operations performed on database 207-a may be removed (e.g., by reversing the effect of the operations). Accordingly, database 207-a may be restored to a state preceding the initiation of the transaction (as if the subset of operations had never been performed). Committing changes to database 207-a at a transaction-level may maintain database 207-a in a transactionally consistent state and ensure that database 207-a is valid—e.g., does not violate any rules, conditions, or constraints applied to database 207-a.

In some examples, computing system 205-a may perform a change logging operation that keeps track of the transactions committed to database 207-a as well as the operations performed to execute the transactions. The transactions and operations may be inputted into a change log, where each transaction may be associated with a log sequence number (LSN) and each operation used to perform a transaction may be associated with a transaction sequence number, which may also be referred to as an operation sequence number (OSN). In some examples, an entry corresponding to an OSN may be referred to as a change record. The computing system 205-a may periodically run a capture job to capture committed transactions (e.g., every minute) and periodically run a cleanup job (e.g., every hour) to remove entries from the change log. In some examples, computing system 205-a may enable change logging in response to a user request (e.g., if a user wants to perform debugging of the database).

Backup service 210-a may be configured to backup information (e.g., a database) at computing system 205-a. Backup service 210-a may be one or more servers, one or more devices, one or more virtual machines, a software application (e.g., an agent), or the like. In some examples, backup service 210-a may be located or implemented within computing system 205-a—e.g., as an agent that is separate from a service used to manage database 207-a. In some cases, backup service may be located or implemented within a storage appliance, such as storage appliance 110 of FIG. 1.

Backup service 210-a may store exported database 212-a as the result of an export operation or backup operation being initiated at computing system 205-a. In some examples, the export operation is initiated by computing system 205-a—e.g., in accordance with a schedule. In other examples, the export operation is triggered by backup service 210-a.

The export operation may take a certain amount of time to complete as the computing system 205-a may scan database 207-a table-by-table, where database 207-a may include tens, hundreds, or thousands of tables. In some examples, while an export operation for database 207-a is ongoing, one or more transactions may be initiated for database 207-a (e.g., if database 207-a is a live database). In some cases, an export operation may capture only a subset of the operations used to complete a transaction initiated for database 207-a during an export. Accordingly, exported database 212-a may not be transactionally consistent e.g., because exported database 212-a may reflect a partially completed transaction. Examples where an exported database has captured a partially completed transaction are disclosed herein, including with reference to FIG. 2B.

To bring transactional consistency to exported database 212-a (in the event exported database 212-a includes a partially completed transaction), backup service 210-a may be configured to use a change log maintained by computing system 205-a to apply otherwise unapplied operations to exported database 212-a. In some examples, prior to initiating the export operation, computing system 205-a may enable change logging—e.g., based on a request from backup service 210-a, in accordance with a backup schedule, or both. The change logging may be enabled for database 207-a using the system procedure sys.sp_cdc_enable_db (which may set up capture and clean up jobs) and for tables in database 207-a using the system procedure sys.sp_cdc_enable_table—e.g., if database 207-a is a Microsoft SQL Server database. In some examples, backup service 210-a invokes the system procedures at computing system 205-a.

Also, prior to initiating the export operation, the latest log sequence number of the change log may be obtained. In some examples, backup service 210-a invokes the system procedure sys.fn_cdc_get_max_lsn( )(e.g., if database 207-a is a Microsoft SQL Server database) to retrieve the latest log sequence number, which may be referred to as $LSN_i$, from computing system 205-*a*. Backup service 210-*a* may record the latest log sequence number and may consider transactions committed after the latest log sequence number (e.g., having LSNs that are greater than $LSN_i$) for application to exported database 212-*a*.

After database 207-*a* is exported resulting in exported database 212-*a*, the latest log sequence number of the change log may again be obtained. In some examples, backup service 210-*a* invokes, for a second time, the system procedure sys.fn_cdc_get_max_lsn( ) to retrieve the latest log sequence number, which may be referred to as $LSN_j$. If the $LSN_j$ is not equal to $LSN_i$, it may be determined (e.g., by computing system 205-*a* or backup service 210-*a*) that one or more transactions were committed to database 207-*a* during the export operation and that exported database 212-*a* is possibly not transactionally consistent. Based on determining that exported database 212-*a* is possibly not transactionally consistent, backup service 210-*a* may obtain a relevant portion of the change log from computing system 205-*a* e.g., the portion of the change log including the entries of $LSN_i+1$ to $LSN_j$, which may be represented as ($LSN_i$: $LSN_j$]. Backup service 210-*a* may use the portion of the change log to obtain updated database 214-*a*—e.g., by updating exported database 212-*a* resulting in updated database 214-*a*. Operations for using the change log to updated database 214-*a* are disclosed in more detail herein, including with reference to FIGS. 3 and 4.

Storage system 215-*a* may be configured to store backup databases, such as updated database 214-*a* or exported database 212-*a* (if determined as transactionally consistent). Storage system 215-*a* may include solid state storage, hard drive disk storage, magnetic tape storage, or any combination thereof. In some cases, storage system 215-*a* is located or implemented within storage appliance 110 of FIG. 1 or included in a local or private network that includes storage appliance 110.

Figure 2B:
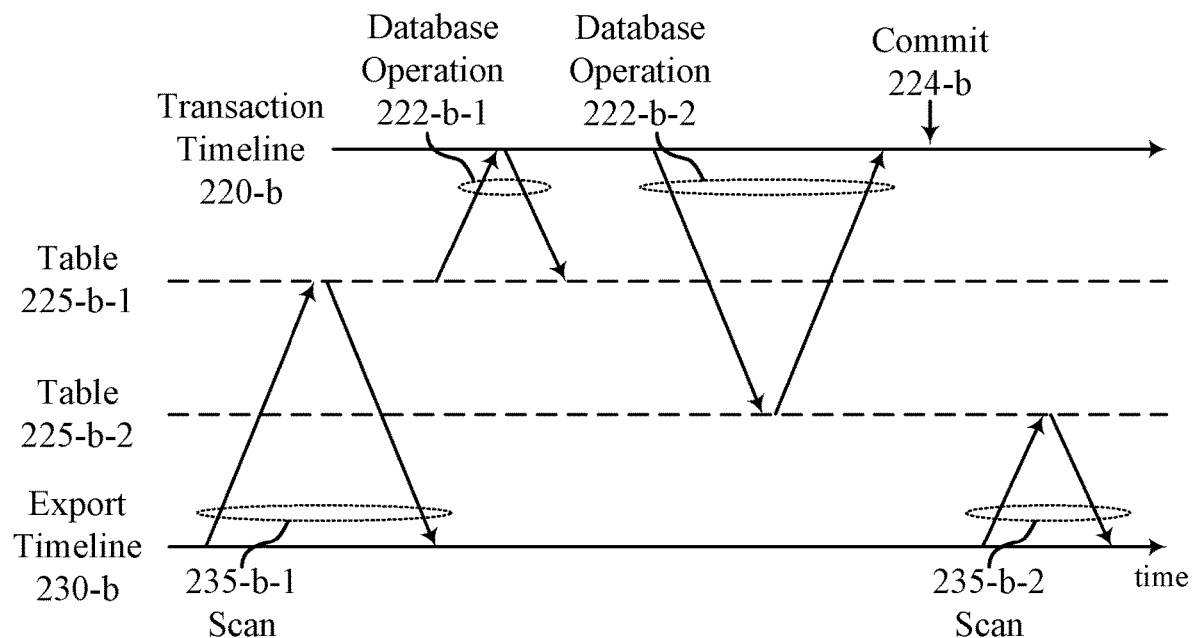
FIG. 2B illustrates an example timeline of a partially-captured transaction in accordance with examples as disclosed herein.

FIG. 2B illustrates an example timeline of a partially-captured transaction in accordance with examples as disclosed herein.

Timeline 202-*b* depicts scan operations (e.g., first scan operation 235-*b*-1 and second scan operation 235-*b*-2) of an export operation as well as database operations (e.g., first database operation 222-*b*-1 and second database operation 222-*b*-2) of a transaction that is committed to database 207-*a* during the export operation. The transaction may correspond to a log sequence number ($LSN_{i+k}$). Timeline 202-*b* includes transaction timeline 220-*b* and export timeline 230-*b*.

Transaction timeline 220-*b* depicts database operations 222-*b* used to commit the transaction to database 207-*a*. First database operation 222-*b*-1 may affect first table 225-*b*-1 in database 207-*a*—e.g., first database operation 222-*b*-1 may insert a row into first table 225-*b*-1. Second database operation 222-*b*-2 may affect second table 225-*b*-2—e.g., second database operation 222-*b*-2 may delete a row from second table 225-*b*-2. The transaction may be committed to database 207-*a* at commit time 224-*b* after performing first database operation 222-*b*-1 and second database operation 222-*b*-2.

Export timeline 230-*b* depicts scan operations 235-*b* used to scan database 207-*a* to export the contents of database 207-*a* to exported database 212-*a*, where the export operation may end after second scan operation 235-*b*-2. First scan operation 235-*b*-1 may scan first table 225-*b*-1 prior to a performance of first database operation 222-*b*-1. Accordingly, exported database 212-*a* may not reflect changes to first table 225-*b*-1 affected by first database operation 222-*b*-1. Second scan operation 235-*b*-2 may scan second table 225-*b*-2 after a performance of second database operation 222-*b*-2. Thus, exported database 212-*a* may reflect the changes to second table 225-*b*-2. And, therefore, exported database 212-*a* may only partially capture the transaction committed to database 207-*a*, and thus may be transactionally inconsistent. As described herein, including in FIG. 2A, change records generated during the export operation may be used to bring transactional consistency to exported database 212-*a*.

In some examples, a transaction may similarly be partially captured if second scan operation 235-*b*-2 occurs before database operation 222-*b*-1 and first scan operation 235-*b*-1 occurs after both second database operation 222-*b*-2 and commit operation 224-*b*. In summary, for transactions that commit their changes to the database while the export database scan is ongoing, the operations from the transactions may be exported partially, yielding a database export that is transactionally inconsistent.

In some examples, first scan operation 235-*b*-1 occurs after first database operation 222-*b*-1, and second scan operation 235-*b*-2 occurs after second database operation 222-*b*-2. In such cases, the full transaction may be captured by exported database 212-*a*, and exported database 212-*a* may be transactionally consistent. In some examples, first scan operation 235-*b*-1 occurs before first database operation 222-*b*-1, and second scan operation 235-*b*-2 occurs before second database operation 222-*b*-2. In such cases, the full transaction may be missed by exported database 212-*a*, and exported database 212-*a* may be transactionally consistent despite missing a transaction committed to database 207-*a* during the export operation.

Figure 3:
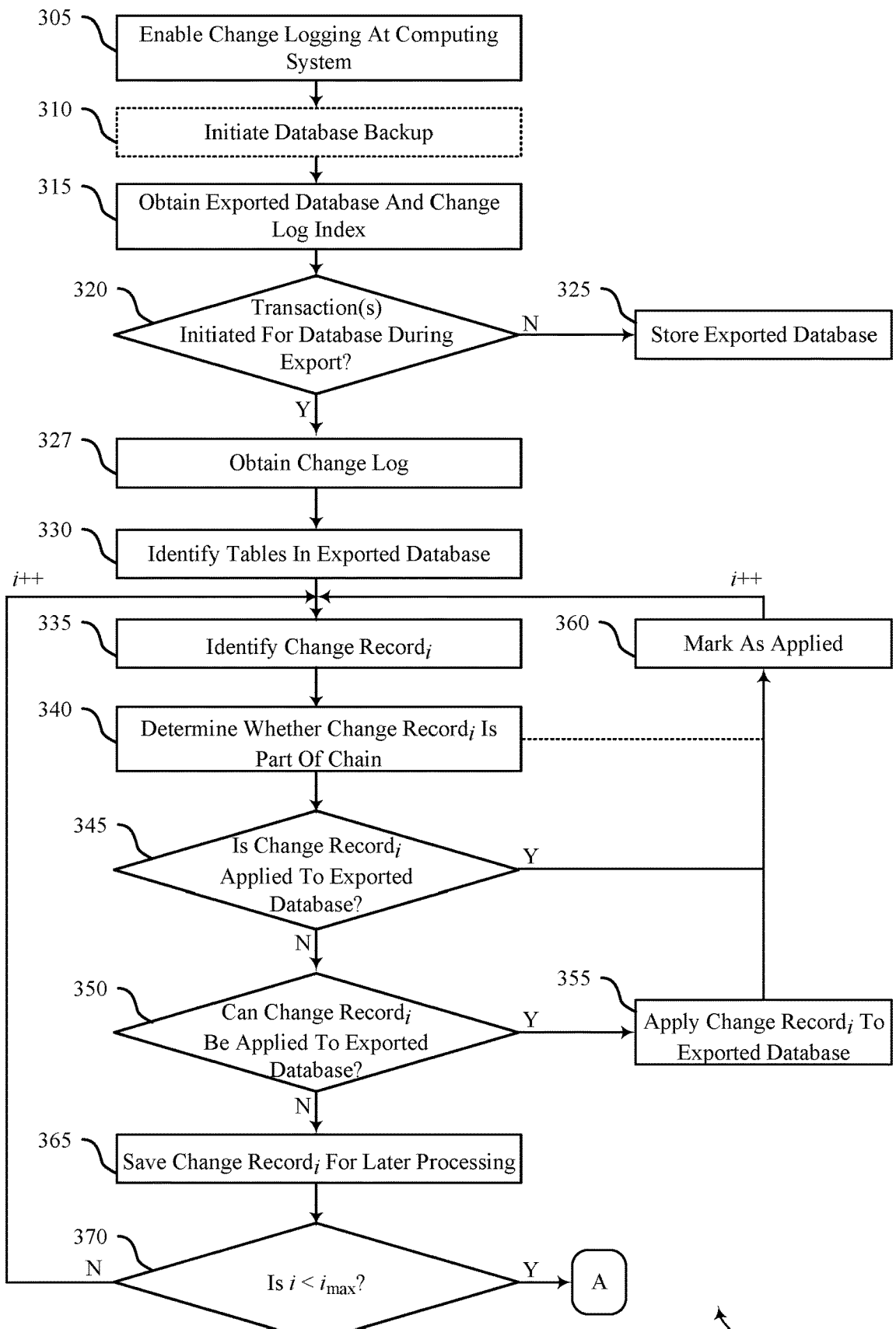
FIG. 3 illustrates an example set of operations for transactionally consistent database exports in accordance with examples as disclosed herein.

FIG. 3 illustrates an example set of operations that supports transactionally consistent database exports in accordance with examples as disclosed herein.

Flowchart 300 may be performed by a backup service or storage appliance, which may be respective examples of a backup service or storage appliance described herein. In some examples, flowchart 300 illustrates an example set of operations performed to support transactionally consistent database exports. For example, flowchart 300 may include operations for backing up a database stored at a server, including operations for determining whether changes made to the database at the server are reflected in an exported version of the database as well as operations for updating the exported version of the database.

Aspects of the flowchart 300 may be implemented by a controller, among other components. Additionally, or alternatively, aspects of the flowchart 300 may be implemented as instructions stored in memory (e.g., firmware stored in a memory coupled with a controller). For example, the instructions, when executed by a controller (e.g., at storage appliance 110), may cause the controller to perform the operations of the flowchart 300.

One or more of the operations described in flowchart 300 may be performed earlier or later, omitted, replaced, supplemented, or combined with another operation. Also, additional operations described herein may replace, supplement or be combined with one or more of the operations described in flowchart 300.

At 305, change logging may be enabled at a computing system (e.g., computing system 205-*a*) that stores a database. In some examples, a backup service (e.g., backup service 210-*a*) may enable the change logging at the computing system—e.g., by sending a message to the computing system. In other examples, the computing system may enable the change logging in accordance with a schedule. To enable change logging, the computing system may use a system procedure, sys.sp_cdc_enable_db, for the database. The computing system may also use another system procedure, sys.sp_cdc_enable_table for each table in the database. In some examples, the computing system may disable support for recording net changes to the database.

After enabling change logging, the computing system may begin generating a change log. The change log may include a first set of entries for each transaction committed to the database after change logging is enabled. The first set of entries may each be associated with an index, which may be referred to as a log sequence number. The change log may also include a second set of entries indicating a set of operations performed to execute the transactions committed to the database. The second set of entries may each be associated with an index, which may be referred to as an operation sequence number, or alternatively, as a transaction sequence number.

At 310, the backing up of the database may be initiated. In some examples, the backup operation is initiated in response to a message received from the backup service. Additionally, or alternatively, the backup operation is initiated in accordance with a backup schedule. After initiating the backup operation, the computing system may begin exporting the database to the backup service. The computing system may export the database using an SQLPackage utility.

In some examples, prior to or concurrently with initiating the backup operation, the computing system may record a log sequence number of the latest entry ($LSN_i$) in the change log—e.g., using the system procedure sys.fn_cdc_get_max_lsn( ) In some examples, the computing system may send the first latest log sequence number to the backup service. In some examples, the backup service may send a message to the computing system invoking sys.fn_cdc_get_max_lsn( ) and requesting the first latest log sequence number. The first latest log sequence number may correspond to the latest transaction committed to the database at the computing system prior to the initiation of the backup operation.

At 315, the backup service may obtain the exported database from the computing system. The exported database may be exported from the computing system and saved at the backup service in accordance with a BACPAC format. For example, the exported database may be a ZIP file that holds a schema and data for a database. The schema of the database may be captured in XML files and the data of the database may be captured in or more BCP files per table in the database. The BCP files may be organized based on an index of a table in the database.

The backup service may also obtain a change log index from the computing system. In some examples, the backup service may receive an indication of a log sequence number of the latest entry ($LSN_j$) in the change log at the end of the export operation. For example, at the end of the export operation, the computing system may record the second latest log sequence number—e.g., using the system procedure sys.fn_cdc_get_max_lsn( ) The computing system may send the second latest log sequence number to the backup service. In some examples, the backup service may send a message to the computing system invoking sys.fn_cdc_get_max_lsn( ) and requesting the second latest log sequence number.

At 320, a determination of whether one or more transactions were committed to the database at the computing system during the export operation may be made. To determine whether any transactions were committed, the second latest log sequence number ($LSN_j$) may be compared with the first latest log sequence number ($LSN_i$). If $LSN_j$ is not equal to (e.g., is greater than) $LSN_i$, it may be determined (e.g., by the computing system or the backup service) that one or more transactions were committed to the database during the export operation.

Otherwise if $LSN_j$ is equal to $LSN_i$, it may be determined that no transactions were committed to the database during the export operation. In such cases, the backup service may determine that the exported database is transactionally consistent and includes the same data as the database at the computing system.

At 325, the exported database may be stored (e.g., at storage system 215-*a*) based on determining that no transactions were committed to the database during the export operation.

At 327, the backup service may obtain a portion of the change log from the computing system based on determining that one or more transactions were committed to the database during the export operation, the portion of the change log indicating the one or more transactions. In some examples, the portion of the change log is obtained using the procedure cdc.fn_cdc_get_all_changes_<table-name> (e.g., if the database is a Microsoft SQL Server database) to retrieve the change tracking data for tables modified during the half open interval associated with LSN and $LSN_j$ (which may be referred to as ($LSN_i$: $LSN_j$]). That is, for each of the tables modified during the export operation, change records for transactions corresponding to log sequence numbers that occur after LSN (e.g., $LSN_{i+1}$) up through a last transaction committed to the database ($LSN_j$) may be obtained at the backup service. In some examples, the backup service may send a message to the computing system invoking cdc.fn_cdc_get_all_changes_<table-name> and requesting the portion of the change log.

In some examples, the backup service fetches the change log such that the change records are obtained in the ascending order of both LSN and OSN values. By obtaining the LSN and OSN values in ascending order, the backup service may process the change records in the same order in which the corresponding operations were applied to the database at the computing system. After obtaining the portion of the change log, the backup service may convert the CDC records to the BCP format and store the BCP files for subsequent processing.

At 330, the backup service may process the file containing the exported database. In some examples, the backup service iterates through the files (e.g., XML and BCP files) of the exported database file. The backup service may ignore XML files. For BCP files, the backup service may extract a table name and determine whether the portion of the change log includes change records corresponding to the table. The backup service may ignore BCP files associated with tables that are not associated with any change records in the portion of the change. For tables that are associated with change records, the backup service may process the related BCP files to determine whether the operations corresponding to the change records have been applied to the BCP files of the table or can be applied to the BCP files of the table as described with reference to the operations described from 335 to 370.

At 335, the backup service may identify a change record of the change records included in the portion of the change log—e.g., in accordance with an ascending order of change records.

At 340, the backup service may determine whether the change record is a part of a chain of transactions. A chain of transactions may include a series of transactions that affect a record—e.g., a record may be inserted, updated, and deleted in a set of chained transactions. Also, a chain of transactions may include a set of transactions that follow an order—e.g., an order status cell that is updated from New, Payment Pending, Delivering, and Delivered. Chained transactions can affect one or more rows, one or more tables, or both. Change records for chained transactions may be identified based on a state of the change records after a transaction and before a subsequent transaction. That is, the change record after a transaction may exactly match a change record before a subsequent transaction. This relationship is described in more detail herein, including with reference to FIG. 5.

In some examples, the backup service may proceed to perform the operations described at 360 based on determining that the change record is a part of a chain. For example, the backup service may proceed to perform the operations described with reference to 360 based on determining that a later change record in the chain has been applied to the exported database.

At 345, the backup service may determine whether the change record has been applied to a table of the exported database. Each change record may include (in BCP format) the values of each column in a row before a modification, the values of each column in the row after a modification, or both. If the change record is identified as having been applied to the database, the backup service may perform the operations described with reference to 360. Otherwise, the backup service may perform the operations described with reference to 350.

There may be different types of change records. For example, for some databases (e.g., a Microsoft SQL Server database), the change records may include an insert change record (which may be referred to as an insert record), a delete change record (which may be referred to as a delete record), and an update change record (which may be referred to as an update record). An insert record may indicate the values for each column in a row that is inserted into a table. A delete record may include the values for each column of a row that is deleted from a table. An update record may include the values for each column of a row in a table prior to the row being updated (which may be referred to as pre-update values) and the values for each column of the row after the row is updated (which may be referred to as post-update values). For other databases, additional types of change records may be used.

In some examples, the change record may be compared with each row of a table identified at 330—e.g., by comparing the change record with each row of the table indicated by a BCP file for the table. In some examples, the backup service may determine whether a byte sequence (e.g., a BCP byte sequence) of the change record is included in a BCP file of one or more BCP files for the table.

In some examples, before comparing a change record with a BCP file, the BCP file and its BCP byte sequence may be processed using a cuckoo filter—e.g., the BCP file and BCP byte sequence may be loaded into the cuckoo filter. A cuckoo filter may estimate with one hundred percent accuracy whether an element is absent in a set and with less accuracy (e.g., less than one hundred percent) whether a given element is present in a set. That is, if an output of a cuckoo filter indicates that an input is not included in the set, the chance that the input is included in the set will be zero percent. Alternatively, if the output of the cuckoo filter indicates that an input is included in the set, the chance that the input is included in the set may be less than a hundred percent.

Accordingly, if the cuckoo filter indicates that the change record is not included in a BCP file, the backup service may skip comparing the change record with BCP byte sequences in the BCP file—e.g., because the cuckoo filter may indicate with a hundred percent certainty that the change record is not included in the BCP file. Otherwise, if the cuckoo filter indicates that the change record is included in the BCP file, the backup service may check the BCP file for the change record (even though the change record may not be present in the BCP file). In some examples, a cuckoo filter is considered as a space-efficient view of a portion of a given table (e.g., that corresponds to the BCP file).

In some examples, before processing a set of change records for a table, each stored BCP byte sequence in a set of BCP files for the table is compared with the set of change records to determine whether the stored BCP byte sequence matches any of the change records of the set of change records, using a cuckoo filter. If the cuckoo filter indicates that a stored BCP byte sequence fails to match any of the change records, the backup service may not compare any of the change records with the stored BCP byte sequence. By ruling out a subset of the BCP files or stored BCP byte sequences for a table, the latency of the operation for determining whether the change record has been applied to the table may be reduced—e.g., if the change records affect a small number of rows in a table, a small portion of a table, or both.

If the change record is an insert record, at 345, the backup service may compare a byte sequence corresponding to the inserted record with the stored byte sequences in a BCP file for the table. If the backup service determines the byte sequence fails to match a stored byte sequence, the backup service may determine the insert record has not been applied to the exported database and proceed to the operation described with reference to 350. Otherwise, if the backup service determines the byte sequence matches a stored byte sequence, the backup service may determine that the insert record has been applied to the exported database and proceed to the operation described with reference to 360.

If the change record is a delete record, at 345, the backup service may compare a byte sequence corresponding to the deleted record with the stored byte sequences in a BCP file for the table. If the backup service determines the byte sequence matches a stored byte sequence, the backup service may determine that the delete record has not been applied to the exported database and proceed to the operation described with reference to 350. Otherwise, if the backup service determines the byte sequence fails to match a stored byte sequence, the backup service may not make a determination as to whether the delete record has been applied to the exported database and may proceed to the operation described with reference to 365.

If the change record is an update record, at 345, the backup service may compare a pre-update byte sequence corresponding to the updated record with the stored byte sequences in a BCP file for the table. If the backup service determines the pre-update byte sequence matches a stored byte sequence, the backup service may determine that the update record has not been applied to the exported database and proceed to perform the operations described with reference to 350.

If the backup service determines the pre-update byte sequence fails to match a stored byte sequence, the backup service may compare a post-update byte sequence corresponding to the updated record with the stored byte sequences in the BCP file for the table. If the backup service determines the post-update byte sequence matches the stored byte sequence, the backup service may determine that the update record has been applied to the exported database and proceed to the operation described with reference to 360. Otherwise, if the backup service determines the post-update byte sequence fails to match the stored byte sequence, the backup service may not make a determination as to whether the update record has been applied to the exported database and may proceed to perform the operations described with reference to 365.

At 350, the backup service may determine whether a change record can be applied to the exported database based on identifying the change record as unapplied to the exported database. If it is determined that the change record can be applied to the database, the backup service may perform the operations described with reference to 355. Otherwise, the backup service may perform the operations described with reference to 365.

If the change record is a delete record, at 350, the backup service may compare a byte sequence corresponding to the deleted record with the stored byte sequences in a BCP file for the table. If the backup service determines the byte sequence matches a stored byte sequence, the backup service may proceed to the operation described with reference to 355 to apply the delete record to the exported database. Otherwise, if the backup service determines the byte sequence fails to match a stored byte sequence, the backup service may not make a determination as to whether the delete record has been applied to the exported database and may proceed to the operation described with reference to 365.

If the change record is an update record, at 350, the backup service may compare a pre-update byte sequence corresponding to the updated record with the stored byte sequences in a BCP file for the table. If the backup service determines the pre-update byte sequence matches a stored byte sequence, the backup service may proceed to the operation described with reference to 355 to apply the update record to the exported database.

If the backup service determines the pre-update byte sequence fails to match a stored byte sequence, the backup service may compare a post-update byte sequence corresponding to the updated record with the stored byte sequences in the BCP file for the table. Otherwise, if the backup service determines the post-update byte sequence fails to match the stored byte sequence, the backup service may not make a determination as to whether the update record has been applied to the exported database and may proceed to perform the operations described with reference to 365.

At 355, the backup service may apply the change record to the exported database based on determining that the unapplied change record can be applied to the exported database. If the change record is a delete record, the backup service may remove, from the BCP file, the stored byte sequence corresponding to the deleted byte sequence and may proceed to perform the operations described with reference to 360. If the change record is an update record, the backup service may remove, from the BCP file, the stored byte sequence corresponding to the pre-update byte sequence and append the post-update byte sequence to the BCP file as a new byte sequence.

In some examples, when a cuckoo filter is used (e.g., as described with reference to 345), the set of stored BCP byte sequences loaded into the cuckoo filter from the BCP file may be updated to reflect the updated set of BCP byte sequences in the BCP file. As described herein, a cuckoo filter may be considered as a space-efficient view of a portion of a given table (e.g., corresponding to the BCP file), and thus the stored BCP byte sequences may be updated to maintain consistency with an updated version of the portion of the given table.

At 360, the backup service may mark the change record as applied. In some examples, marking the change record as applied includes setting a flag in the change record. In some examples, marking the change record as applied includes indicating at a separate location within the backup service that the change record has been applied. After marking the change record as applied, the backup service may return to perform the operations described with reference to 335 for a next change record.

As 365, the backup service may save the change record for later processing based on determining that the change record has not been applied to the exported database and that the change record cannot currently be applied to the exported database.

At 370, the backup service may determine whether all of the change records in the portion of the change log have been processed. If the backup service determines that less than all of the change records have been processed, the backup service may return to perform the operations described with reference to 335 for a next change record. Otherwise, if the backup service determines that all of the change records have been processed, the backup service may proceed to perform additional operations that are described herein, including with reference to FIG. 4. In some examples, the backup service may similarly determine whether all of the change records in the portion of the change log have been processed and whether to proceed to perform the additional operations after performing the operations described with reference to 360.

The operations described with reference to 335 through 370 may be performed for each table in the exported database identified at 330 as being associated with a change record. In some examples, the operations described with reference to 335 through 370 may be performed for each BCP file of each table in the exported database identified at 330 as being associated with a change record.

Figure 4:
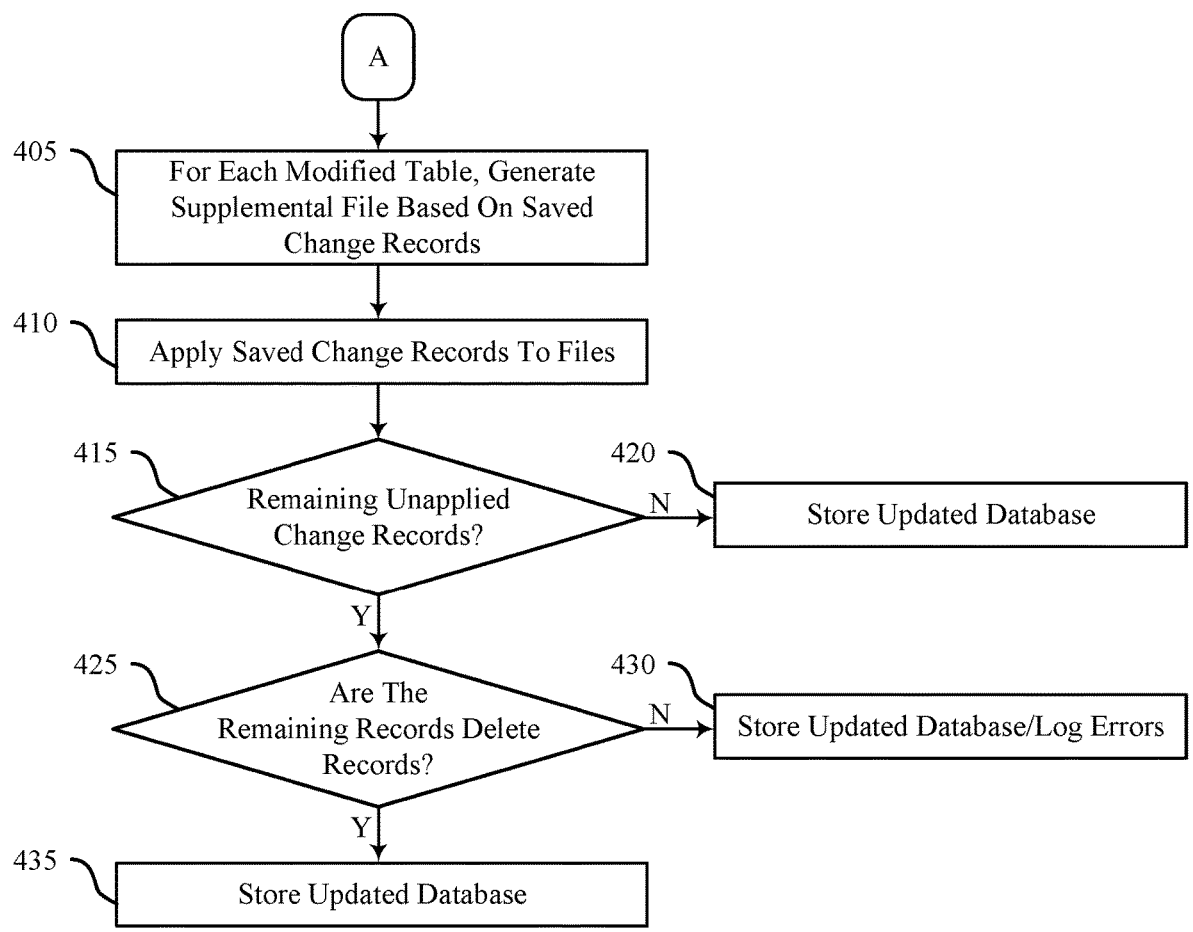
FIG. 4 illustrates an example set of operations for transactionally consistent database exports in accordance with examples as disclosed herein.

FIG. 4 illustrates an example set of operations that supports transactionally consistent database exports in accordance with examples as disclosed herein.

Flowchart 400 may be performed by a backup service or storage appliance, which may be respective examples of a backup service or storage appliance described herein. In some examples, flowchart 400 illustrates an example set of operations performed to support transactionally consistent database exports. For example, flowchart 400 may include operations for updating the exported database and saving information for bringing transactional consistency to the exported database.

Aspects of the flowchart 400 may be implemented by a controller, among other components. Additionally, or alternatively, aspects of the flowchart 400 may be implemented as instructions stored in memory (e.g., firmware stored in a memory coupled with a controller). For example, the instructions, when executed by a controller (e.g., at storage appliance 110), may cause the controller to perform the operations of the flowchart 400.

One or more of the operations described in flowchart 400 may be performed earlier or later, omitted, replaced, supplemented, or combined with another operation. Also, additional operations described herein may replace, supplement or be combined with one or more of the operations described in flowchart 400.

At 405, for each table associated with one or more change records in a portion of a change log obtained from a computing system, a new BCP file may be generated that includes the unapplied change records saved with reference to 365 of FIG. 3.

At 410, the saved change records may be applied to the new BCP files. For example, for a new BCP file associated with a first table, the saved change records for the first table may be saved to the new BCP file. Saving the change records to the new BCP file may include applying one or more of the change records to the exported database and marking the applied one or more change records as applied.

For insert records, the BCP byte sequences may be added to the new BCP file. After adding the BCP byte sequences to the new BCP file, the insert records may be marked as applied, as similarly described with reference to 360 of FIG. 3. The added BCP byte sequence may include an indication of a row in a table of the database, the values of each column in the row, or both.

For delete records, the backup service may determine whether the BCP byte sequences match any of the byte sequences stored in the new BCP file. If any of the BCP byte sequences match any stored byte sequences in the new BCP file, the backup service may remove the stored byte sequence from the new BCP file and mark the corresponding delete record as applied.

For update records, the backup service may determine whether the pre-update BCP byte sequences match any of the byte sequences stored in the new BCP file. If any of the pre-update BCP byte sequences match any stored byte sequences in the new BCP file, the backup service may replace the stored byte sequence of the new BCP file with the post-update BCP byte sequence and mark the corresponding update record as applied. In some examples, after processing the update records, the backup service may again check to see if any of the delete records match any of the stored byte sequences of the new BCP file.

At 415, the backup service may determine whether there are any change records of the portion of the change log that have not yet been applied. If the backup service determines that all of the changes records have been applied, the backup service may proceed to perform the operations described with reference to 420. Otherwise, the backup service may proceed to perform the operations described with reference to 425.

At 420, the backup service may store the updated database. The updated database may be stored as a BACPAC file including the XML, and BCP files of the exported database along with any updated and/or added BCP files. In some examples, the updated database is stored in storage system 215-a.

At 425, the backup service may determine whether the unapplied change records are delete records based on determining that there are remaining unapplied change records. If the backup service determines that all of the unapplied change records are delete records, the backup service may mark the remaining unapplied change records as applied and proceed to perform the operations described with reference to 435—e.g., because delete records correspond to data that is not in the database at the computing system or the exported database. Otherwise, if the backup service determines that one or more of the unapplied change records are not delete records, the backup service may mark any of the unapplied records that are delete records as applied and proceed to perform the operations described with reference to 435.

At 430, the backup service may store the updated database along with an indication of one or more errors based on determining that the remaining unapplied change records include one or more change records that are not delete records. In some examples, the backup service may store the portion of the change log with the updated database based on the determination that the remaining change records include one or more change records that are not delete records—e.g., to maintain debugging information for the stored database. In some examples, the backup service may refrain from storing the updated database based on the determination that the remaining change records include one or more change records that are not delete records. The backup service may indicate the errors to the computing system after completing the backup operation for the database, when the stored updated database is retrieved by the computing system, or both.

At 435, the backup service may store the updated database as similarly described with reference to 420.

The computing system may retrieve the BACPAC file containing the stored database from storage—e.g., during a recovery procedure. The computing system may rebuild the from the stored database using the XML and BCP files contained in the BACPAC file. In some examples, the computing system receives an indication that one or more errors were identified when storing the BACPAC file. In such cases, the computing system may provide a user a prompt for restoring the database anyway, choosing a different BACPAC file, or declining to restore the database.

Figure 5:
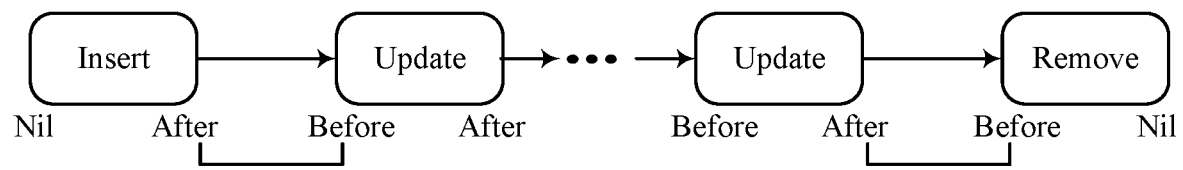
FIG. 5 illustrates an example of a transaction chain that supports transactionally consistent database exports in accordance with examples as disclosed herein.

FIG. 5 illustrates an example of a transaction chain that supports transactionally consistent database exports in accordance with examples as disclosed herein. Transaction chain 500 depicts an example of a sequence of transactions that are included in a chain. As shown in FIG. 5, a state of the before records for a subsequent operation is the same as (e.g., exactly matches) the state of the after records for a previously (e.g., immediately preceding) operation.

Figure 6:
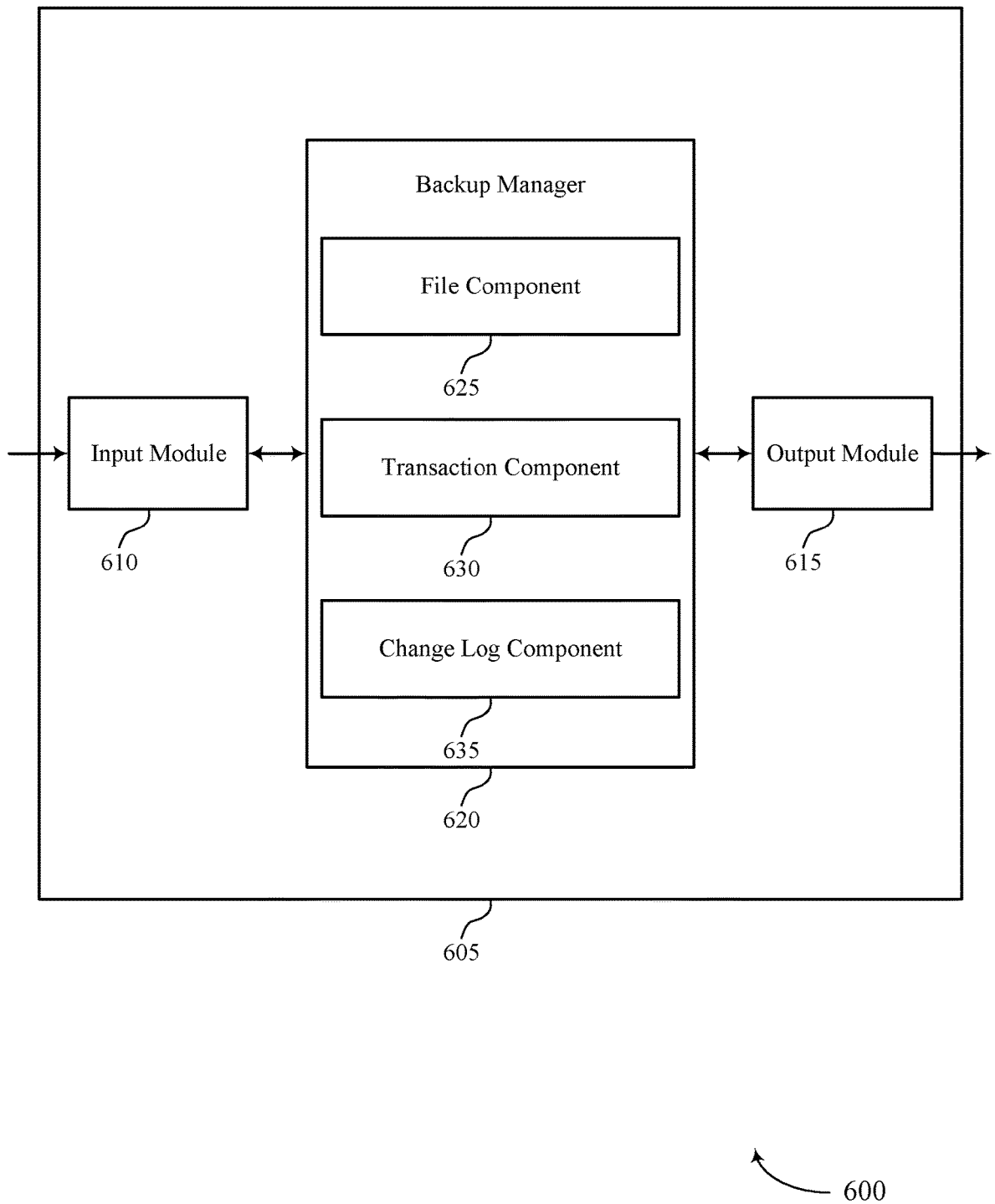
FIG. 6 shows a block diagram of an apparatus that supports transactionally consistent database exports in accordance with examples disclosed herein.

FIG. 6 shows a block diagram 600 of a device 605 that supports transactionally consistent database exports in accordance with examples disclosed herein. The device 605 may include an input module 610, an output module 615, and a backup manager 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the backup manager 620 to support transactionally consistent database exports. In some cases, the input module 610 may be a component of an I/O controller 810 as described with reference to FIG. 8.

The output module 615 may manage output signals for the device 605. For example, the output module 615 may receive signals from other components of the device 605, such as the backup manager 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the backup manager 620 may include a file component 625, a transaction component 630, a change log component 635, or any combination thereof. In some examples, the backup manager 620, or various components thereof, may be configured to perform various operations (e.g., receiving, monitoring, transmitting) using or otherwise in cooperation with the input module 610, the output module 615, or both. For example, the backup manager 620 may receive information from the input module 610, send information to the output module 615, or be integrated in combination with the input module 610, the output module 615, or both to receive information, transmit information, or perform various other operations as described herein.

The file component 625 may be configured as or otherwise support a means for saving, to a file, a representation of an exported database, where the representation is based on a live database being exported from a second computing system via an export operation that spans a time period. The transaction component 630 may be configured as or otherwise support a means for determining, based on the live database being exported, that one or more transactions were committed to the live database during the time period. The change log component 635 may be configured as or otherwise support a means for obtaining, from the second computing system based on determining that the one or more transactions were committed to the live database during the time period, a portion of a log indicating the one or more transactions committed to the live database during the time period. The transaction component 630 may be configured as or otherwise support a means for determining, based on the log, whether the exported database captured the one or more transactions committed to the live database. The file component 625 may be configured as or otherwise support a means for updating the file to represent an updated database that reflects an updated version of the live database based on determining that the exported database failed to capture the one or more transactions, where the updated database reflects an application of the one or more transactions to the exported database.

Figure 7:
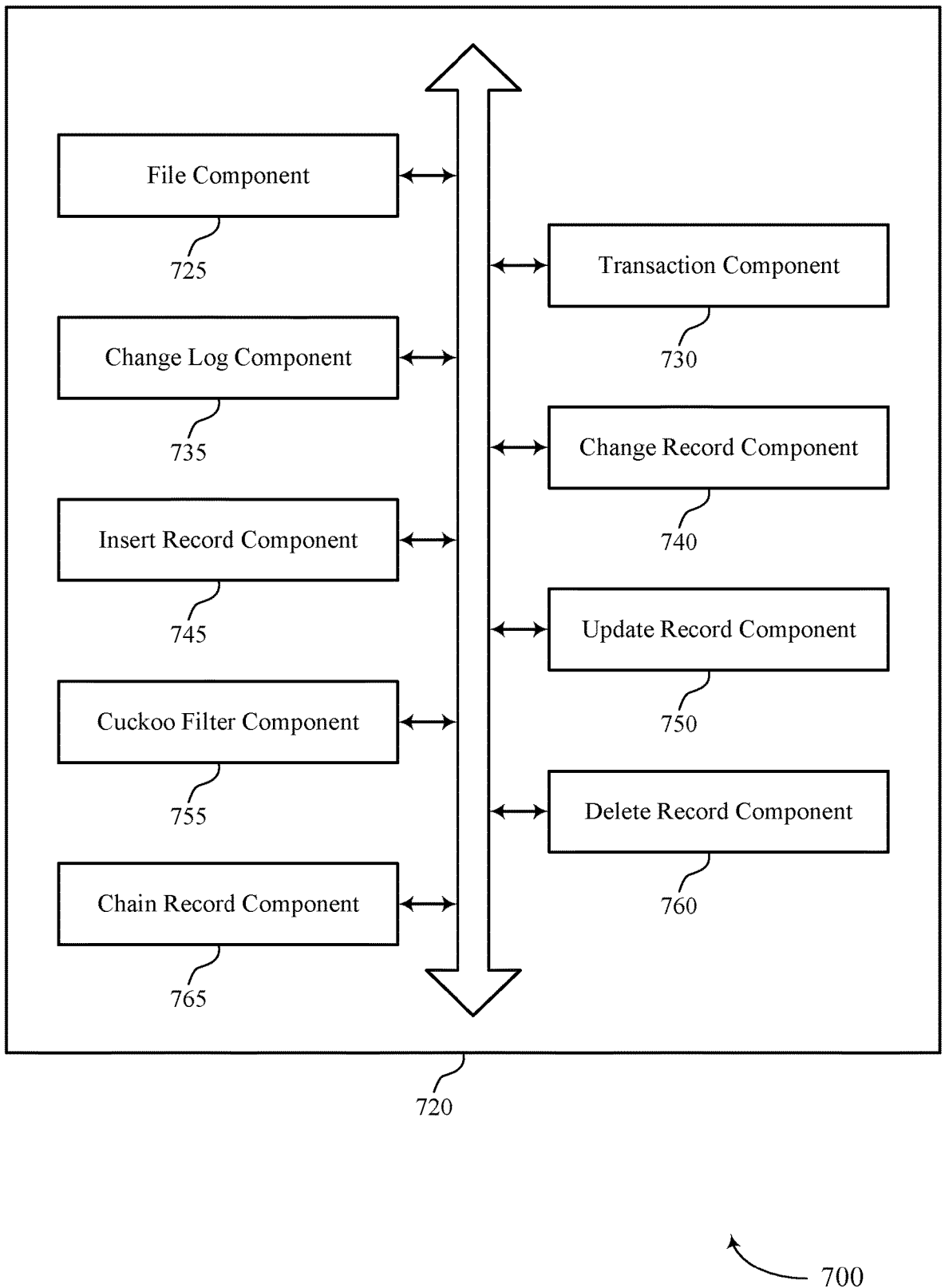
FIG. 7 shows a block diagram of a backup manager that supports transactionally consistent database exports in accordance with examples disclosed herein.

FIG. 7 shows a block diagram 700 of a backup manager 720 that supports transactionally consistent database exports in accordance with examples disclosed herein. The backup manager 720 may be an example of aspects of a backup manager or a backup manager 620, or both, as described herein. The backup manager 720, or various components thereof, may be an example of means for performing various aspects of transactionally consistent database exports as described herein. For example, the backup manager 720 may include a file component 725, a transaction component 730, a change log component 735, a change record component 740, an insert record component 745, an update record component 750, a cuckoo filter component 755, a delete record component 760, a chain record component 765, or any combination thereof. Each of these components may communicate, directly or indirectly, with one another (e.g., via one or more buses).

The file component 725 may be configured as or otherwise support a means for saving, to a file, a representation of an exported database, where the representation is based on a live database being exported from a second computing system via an export operation that spans a time period. The transaction component 730 may be configured as or otherwise support a means for determining, based on the live database being exported, that one or more transactions were committed to the live database during the time period. The change log component 735 may be configured as or otherwise support a means for obtaining, from the second computing system based on determining that the one or more transactions were committed to the live database during the time period, a portion of a log indicating the one or more transactions committed to the live database during the time period. In some examples, the transaction component 730 may be configured as or otherwise support a means for determining, based on the log, whether the exported database captured the one or more transactions committed to the live database. In some examples, the file component 725 may be configured as or otherwise support a means for updating the file to represent an updated database that reflects an updated version of the live database based on determining that the exported database failed to capture the one or more transactions, where the updated database reflects an application of the one or more transactions to the exported database.

In some examples, the change log component 735 may be configured as or otherwise support a means for transmitting, to the second computing system, a message to initiate a change tracking operation for generating the log over a second time period that includes the time period.

In some examples, the transaction component 730 may be configured as or otherwise support a means for transmitting, to the second computing system at a first time that precedes or corresponds to a beginning of the export operation, a first message requesting a first index corresponding to a most recent entry in the log as of the first time. In some examples, the transaction component 730 may be configured as or otherwise support a means for receiving, from the second computing system, the first index in response to the first message. In some examples, the transaction component 730 may be configured as or otherwise support a means for transmitting, to the second computing system at a second time that corresponds to an end of the export operation, a second message requesting a second index corresponding to a most recent entry in the log as of the second time. In some examples, the transaction component 730 may be configured as or otherwise support a means for receiving, from the second computing system, the second index in response to the second message.

In some examples, the transaction component 730 may be configured as or otherwise support a means for comparing the first index and the second index, the first index corresponding to a first transaction committed to the live database prior to the export operation, and the second index corresponding to a second transaction of the one or more transactions committed to the live database during the export operation. In some examples, the transaction component 730 may be configured as or otherwise support a means for determining, based on the comparing, that the second index is different than the first index, where the one or more transactions are determined as being committed to the live database during the time period based on the second index being different than the first index.

In some examples, the change log component 735 may be configured as or otherwise support a means for transmitting, to the second computing system based on determining that the one or more transactions were committed to the live database during the time period, a message requesting the portion of the log corresponding to the time period, where obtaining the portion of the log includes receiving the portion of the log in response to the message, the portion of the log including one or more change records indicating one or more operations applied to the live database during the time period to commit the one or more transactions to the live database during the time period.

In some examples, the message includes a first index of a most recent entry in the log as of a first time that precedes or corresponds to a beginning of the export operation and requesting a second index of a most recent entry in the log as of a second time that corresponds to an end of the export operation, and obtaining the portion of the log includes receiving one or more entries of the log having indices subsequent to the first index and equal to or preceding the second index.

In some examples, the one or more entries correspond to one or more respective transactions committed to the live database during the time period spanned by the export operation, and the portion of the log further includes, for the one or more entries, one or more respective change records of the one or more change records indicating a respective set of operations performed to execute a corresponding transaction of the one or more transactions.

In some examples, the live database includes a set of multiple tables, and the portion of the log indicates, for individual tables of the set of multiple tables to which changes were applied during the time period, a respective set of change records of the one or more change records recorded during the time period for the table.

In some examples, the change log component 735 may be configured as or otherwise support a means for arranging the one or more change records in an order in which corresponding operations were applied to the live database.

In some examples, the change record component 740 may be configured as or otherwise support a means for determining, based on obtaining the portion of the log, that a change record of one or more change records in the portion of the log is applied to the exported database. In some examples, the change record component 740 may be configured as or otherwise support a means for determining (e.g., to support determining that the change record is applied to the exported database) that the change record is one of a first type for inserting data into the live database, a second type for deleting data from the live database, or a third type for modifying data in the live database. In some examples, the insert record component 745 may be configured as or otherwise support a means for (e.g., to support determining that the change record is applied to the exported database), based on the change record being of the first type, determining that the exported database includes a row of data indicated by the change record as inserted into the live database, and marking the change record as applied based on determining that the exported database includes the row of data indicated by the change record as inserted. In some examples, the update record component 750 may be configured as or otherwise support a means for (e.g., to support determining that the change record is applied to the exported database), based on the change record being of the third type, determining that a pre-modified version of a row of data at the live database fails to match a corresponding row of data at the exported database and that a post-modified version of the row of data at the live database matches the corresponding row of data; and marking the change record as applied based on the pre-modified version of the row of data failing to match the corresponding row of data and the post-modified version of the row of data matching the corresponding row of data.

In some examples, the change record component 740 may be configured as or otherwise support a means for determining, based on obtaining the portion of the log, that a change record of one or more change records in the portion of the log is unapplied to the exported database, where determining that the exported database failed to capture the one or more transactions is based on determining that the change record is unapplied.

In some examples, to support determining that the change record is unapplied to the exported database, the change record component 740 may be configured as or otherwise support a means for determining that the change record is one of a first type for inserting data into the live database, a second type for deleting data from the live database, or a third type for modifying data in the live database. In some examples, to support determining that the change record is unapplied to the exported database, the insert record component 745 may be configured as or otherwise support a means for, based on the change record being of the first type, determining that the exported database lacks a row of data indicated by the change record as inserted into the live database. In some examples, to support determining that the change record is unapplied to the exported database, the delete record component 760 may be configured as or otherwise support a means for, based on the change record being of the second type, determining that the exported database includes a row of data indicated by the change record as deleted from the live database. In some examples, to support determining that the change record is unapplied to the exported database, the update record component 750 may be configured as or otherwise support a means for, based on the change record being of the third type, determining that a pre-modified version of a row of data at the live database matches a corresponding row of data at the exported database, or determining that the pre-modified version of the row of data and a post-modified version of the row of data at the live database fails to match the corresponding row of data at the exported database.

In some examples, the change record component 740 may be configured as or otherwise support a means for applying, to the exported database, the change record based on determining that the change record is unapplied to the exported database. In some examples, to support applying the change record, the delete record component 760 may be configured as or otherwise support a means for, based on the change record being of the second type, deleting, from the exported database, the row of data indicated by the change record as deleted, and marking the change record as applied based on deleting the row of data indicated by the change record as deleted. In some examples, to support applying the change record, the update record component 750 may be configured as or otherwise support a means for, based on the change record being of the third type, deleting the corresponding row of data at the exported database that matches the pre-modified version of the row of data at the live database, and marking the change record as applied based on deleting the corresponding row of data at the exported database.

In some examples, the change record component 740 may be configured as or otherwise support a means for determining that the change record is included in a set of change records of the one or more change records, the set of change records used to perform a sequence of dependent operations. In some examples, the chain record component 765 may be configured as or otherwise support a means for determining that a second change record of the set of change records is applied to the exported database, the second change record occurring later in the sequence than the change record. In some examples, the chain record component 765 may be configured as or otherwise support a means for marking the change record as applied based on determining the second change record is applied to the exported database.

In some examples, the change record component 740 may be configured as or otherwise support a means for saving, to the file, the change record based on determining that the change record is unapplied to the exported database and failing to apply the change record to the exported database. In some examples, the change record component 740 may be configured as or otherwise support a means for processing a first set of change records saved to the file in accordance with the first set of change records, where the first set of change records includes the change record, and where the file represents the updated database based on the first set of change records saved to the exported database and a second set of change records applied to the exported database.

In some examples, the change record component 740 may be configured as or otherwise support a means for determining that a change record associated with the one or more transactions committed to the live database is associated with a table of the exported database. In some examples, the cuckoo filter component 755 may be configured as or otherwise support a means for loading, into a cuckoo filter, the change record and a first portion of the table. In some examples, the cuckoo filter component 755 may be configured as or otherwise support a means for receiving, from the cuckoo filter, an indication that the change record matches a row in the first portion of the table. In some examples, the change record component 740 may be configured as or otherwise support a means for scanning each row in the first portion of the table to identify the row in the first portion of the table. In some examples, the change record component 740 may be configured as or otherwise support a means for determining, based on the scanning, that the change record fails to match any rows in the first portion of the table. In some examples, the cuckoo filter component 755 may be configured as or otherwise support a means for loading, into the cuckoo filter based on determining that the change record fails to match any rows in the first portion of the table, the change record and a second portion of the table. In some examples, the cuckoo filter component 755 may be configured as or otherwise support a means for receiving, from the cuckoo filter, an indication that the change record fails to match any rows in the second portion of the table. In some examples, the cuckoo filter component 755 may be configured as or otherwise support a means for loading, into the cuckoo filter based on the cuckoo filter indicating that the change record fails to match any rows in the second portion of the table, the change record and a third portion of the table without scanning the second portion of the table.

Figure 8:
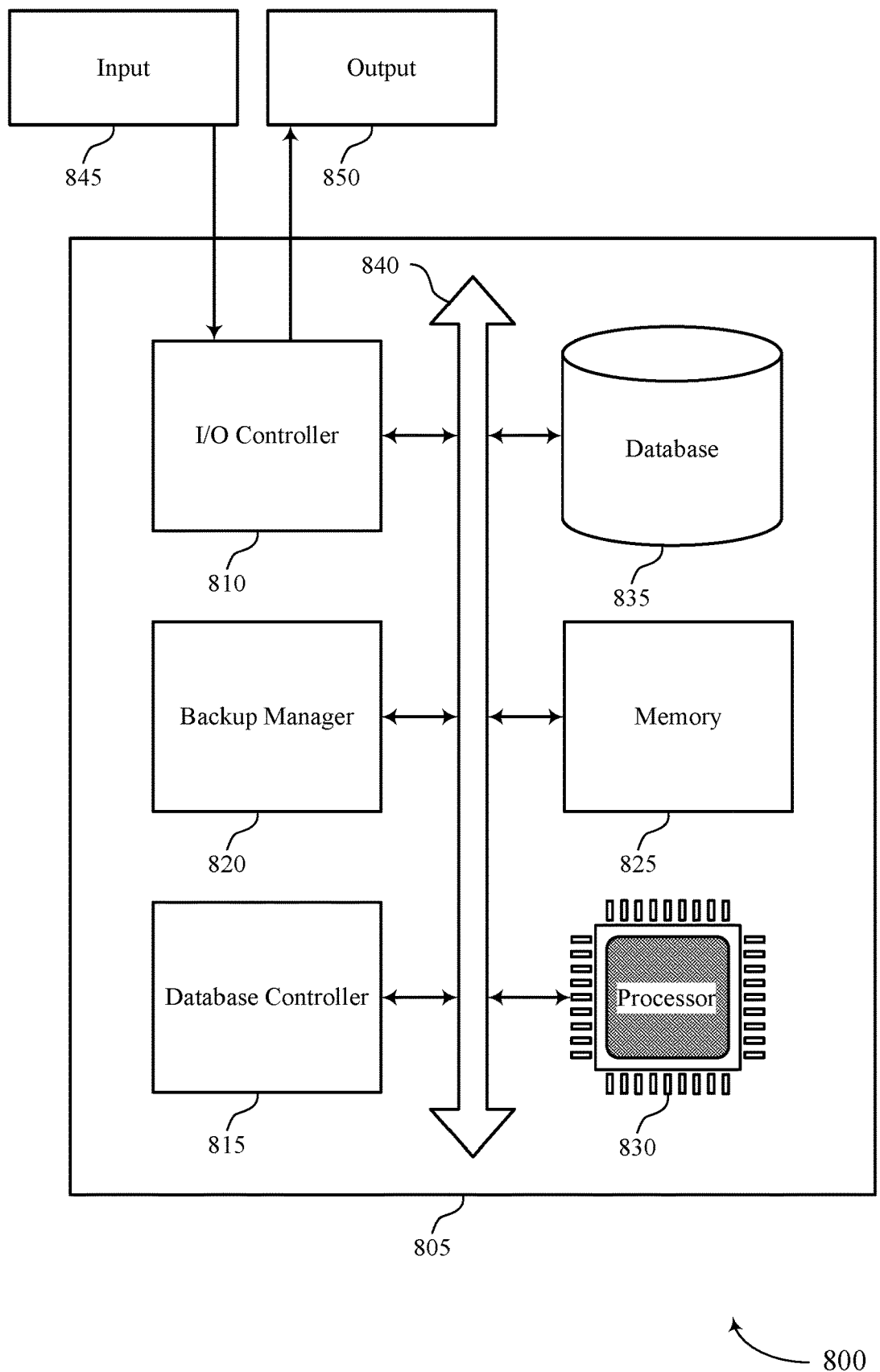
FIG. 8 shows a diagram of a system including a device that supports transactionally consistent database exports in accordance with examples disclosed herein.

FIG. 8 shows a diagram of a system 800 including a device 805 that supports transactionally consistent database exports in accordance with examples disclosed herein. The device 805 may be an example of or include the components of a device 605 as described herein. The device 805 may include components for bi-directional data communications including components for transmitting and receiving communications, such as a backup manager 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and ROM. The memory 825 may store computer-readable, computer-executable software including instructions that, when executed, cause the processor 830 to perform various functions described herein. In some cases, the memory 825 may contain, among other things, a BIOS which may control basic hardware or software operation such as the interaction with peripheral components or devices.

The processor 830 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in memory 825 to perform various functions (e.g., functions or tasks supporting transactionally consistent database exports).

For example, the backup manager 820 may be configured as or otherwise support a means for saving, to a file, a representation of an exported database, where the representation is based on a live database being exported from a second computing system via an export operation that spans a time period. The backup manager 820 may be configured as or otherwise support a means for determining, based on the live database being exported, that one or more transactions were committed to the live database during the time period. The backup manager 820 may be configured as or otherwise support a means for obtaining, from the second computing system based on determining that the one or more transactions were committed to the live database during the time period, a portion of a log indicating the one or more transactions committed to the live database during the time period. The backup manager 820 may be configured as or otherwise support a means for determining, based on the log, whether the exported database captured the one or more transactions committed to the live database. The backup manager 820 may be configured as or otherwise support a means for updating the file to represent an updated database that reflects an updated version of the live database based on determining that the exported database failed to capture the one or more transactions, where the updated database reflects an application of the one or more transactions to the exported database.

Figure 9:
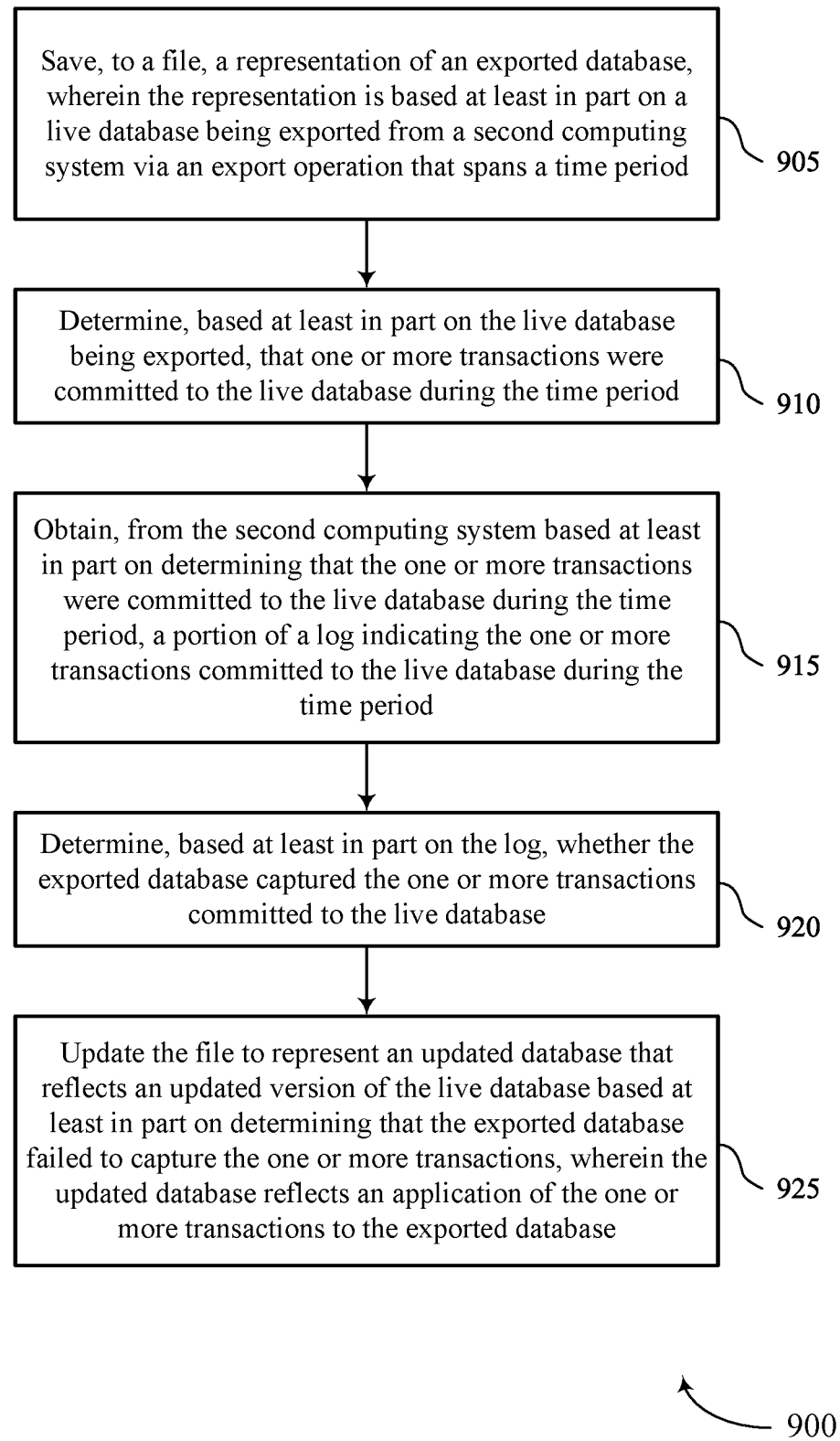
FIG. 9 shows a flowchart illustrating methods that support transactionally consistent database exports in accordance with examples disclosed herein.

FIG. 9 shows a flowchart illustrating a method 900 that supports transactionally consistent database exports in accordance with examples disclosed herein. The operations of the method 900 may be implemented by a storage appliance or its components as described herein. For example, the operations of the method 900 may be performed by a storage appliance as described with reference to FIGS. 1 through 8. In some examples, a storage appliance may execute a set of instructions to control the functional elements of the storage appliance to perform the described functions. Additionally, or alternatively, the storage appliance may perform aspects of the described functions using special-purpose hardware.

At 905, the method may include saving, to a file, a representation of an exported database, where the representation is based on a live database being exported from a second computing system via an export operation that spans a time period. The operations of 905 may be performed in accordance with examples as disclosed herein. In some examples, aspects of the operations of 905 may be performed by a file component 725 as described with reference to FIG. 7.

At 910, the method may include determining, based on the live database being exported, that one or more transactions were committed to the live database during the time period. The operations of 910 may be performed in accordance with examples as disclosed herein. In some examples, aspects of the operations of 910 may be performed by a transaction component 730 as described with reference to FIG. 7.

At 915, the method may include obtaining, from the second computing system based on determining that the one or more transactions were committed to the live database during the time period, a portion of a log indicating the one or more transactions committed to the live database during the time period. The operations of 915 may be performed in accordance with examples as disclosed herein. In some examples, aspects of the operations of 915 may be performed by a change log component 735 as described with reference to FIG. 7.

At 920, the method may include determining, based on the log, whether the exported database captured the one or more transactions committed to the live database. The operations of 920 may be performed in accordance with examples as disclosed herein. In some examples, aspects of the operations of 920 may be performed by a transaction component 730 as described with reference to FIG. 7.

At 925, the method may include updating the file to represent an updated database that reflects an updated version of the live database based on determining that the exported database failed to capture the one or more transactions, where the updated database reflects an application of the one or more transactions to the exported database. The operations of 925 may be performed in accordance with examples as disclosed herein. In some examples, aspects of the operations of 925 may be performed by a file component 725 as described with reference to FIG. 7.

A method is described. The method may include saving, to a file, a representation of an exported database, where the representation is based on a live database being exported from a second computing system via an export operation that spans a time period, determining, based on the live database being exported, that one or more transactions were committed to the live database during the time period, obtaining, from the second computing system based on determining that the one or more transactions were committed to the live database during the time period, a portion of a log indicating the one or more transactions committed to the live database during the time period, determining, based on the log, whether the exported database captured the one or more transactions committed to the live database, and updating the file to represent an updated database that reflects an updated version of the live database based on determining that the exported database failed to capture the one or more transactions, where the updated database reflects an application of the one or more transactions to the exported database.

An apparatus is described. The apparatus may include a processor, memory coupled with the processor, and instructions stored in the memory. The instructions may be executable by the processor to cause the apparatus to save, to a file, a representation of an exported database, where the representation is based on a live database being exported from a second computing system via an export operation that spans a time period, determine, based on the live database being exported, that one or more transactions were committed to the live database during the time period, obtain, from the second computing system based on determining that the one or more transactions were committed to the live database during the time period, a portion of a log indicating the one or more transactions committed to the live database during the time period, determine, based on the log, whether the exported database captured the one or more transactions committed to the live database, and update the file to represent an updated database that reflects an updated version of the live database based on determining that the exported database failed to capture the one or more transactions, where the updated database reflects an application of the one or more transactions to the exported database.

Another apparatus is described. The apparatus may include means for saving, to a file, a representation of an exported database, where the representation is based on a live database being exported from a second computing system via an export operation that spans a time period, means for determining, based on the live database being exported, that one or more transactions were committed to the live database during the time period, means for obtaining, from the second computing system based on determining that the one or more transactions were committed to the live database during the time period, a portion of a log indicating the one or more transactions committed to the live database during the time period, means for determining, based on the log, whether the exported database captured the one or more transactions committed to the live database, and means for updating the file to represent an updated database that reflects an updated version of the live database based on determining that the exported database failed to capture the one or more transactions, where the updated database reflects an application of the one or more transactions to the exported database.

A non-transitory computer-readable medium storing code is described. The code may include instructions executable by a processor to save, to a file, a representation of an exported database, where the representation is based on a live database being exported from a second computing system via an export operation that spans a time period, determine, based on the live database being exported, that one or more transactions were committed to the live database during the time period, obtain, from the second computing system based on determining that the one or more transactions were committed to the live database during the time period, a portion of a log indicating the one or more transactions committed to the live database during the time period, determine, based on the log, whether the exported database captured the one or more transactions committed to the live database, and update the file to represent an updated database that reflects an updated version of the live database based on determining that the exported database failed to capture the one or more transactions, where the updated database reflects an application of the one or more transactions to the exported database.

Some examples of the method, apparatuses, and non-transitory computer-readable medium described herein may further include operations, features, means, or instructions for transmitting, to the second computing system, a message to initiate a change tracking operation for generating the log over a second time period that includes the time period.

Some examples of the method, apparatuses, and non-transitory computer-readable medium described herein may further include operations, features, means, or instructions for transmitting, to the second computing system at a first time that precedes or corresponds to a beginning of the export operation, a first message requesting a first index corresponding to a most recent entry in the log as of the first time, receiving, from the second computing system, the first index in response to the first message, transmitting, to the second computing system at a second time that corresponds to an end of the export operation, a second message requesting a second index corresponding to a most recent entry in the log as of the second time, and receiving, from the second computing system, the second index in response to the second message.

Some examples of the method, apparatuses, and non-transitory computer-readable medium described herein may further include operations, features, means, or instructions for comparing the first index and the second index, the first index corresponding to a first transaction committed to the live database prior to the export operation, and the second index corresponding to a second transaction of the one or more transactions committed to the live database during the export operation, and determining, based on the comparing, that the second index may be different than the first index, where the one or more transactions may be determined as being committed to the live database during the time period based on the second index being different than the first index.

Some examples of the method, apparatuses, and non-transitory computer-readable medium described herein may further include operations, features, means, or instructions for transmitting, to the second computing system based on determining that the one or more transactions were committed to the live database during the time period, a message requesting the portion of the log corresponding to the time period, where obtaining the portion of the log includes receiving the portion of the log in response to the message, the portion of the log including one or more change records indicating one or more operations applied to the live database during the time period to commit the one or more transactions to the live database during the time period.

In some examples of the method, apparatuses, and non-transitory computer-readable medium described herein, the message includes a first index of a most recent entry in the log as of a first time that precedes or corresponds to a beginning of the export operation and requesting a second index of a most recent entry in the log as of a second time that corresponds to an end of the export operation, and obtaining the portion of the log includes receiving one or more entries of the log having indices subsequent to the first index and equal to or preceding the second index.

In some examples of the method, apparatuses, and non-transitory computer-readable medium described herein, the one or more entries correspond to one or more respective transactions committed to the live database during the time period spanned by the export operation, and the portion of the log further includes, for the one or more entries, one or more respective change records of the one or more change records indicating a respective set of operations performed to execute a corresponding transaction of the one or more transactions.

In some examples of the method, apparatuses, and non-transitory computer-readable medium described herein, the live database includes a set of multiple tables, and the portion of the log indicates, for individual tables of the set of multiple tables to which changes were applied during the time period, a respective set of change records of the one or more change records recorded during the time period for the table.

Some examples of the method, apparatuses, and non-transitory computer-readable medium described herein may further include operations, features, means, or instructions for arranging the one or more change records in an order in which corresponding operations were applied to the live database.

Some examples of the method, apparatuses, and non-transitory computer-readable medium described herein may further include operations, features, means, or instructions for determining, based on obtaining the portion of the log, that a change record of one or more change records in the portion of the log may be applied to the exported database, where determining that the change record may be applied to the exported database includes determining that the change record may be one of a first type for inserting data into the live database, a second type for deleting data from the live database, or a third type for modifying data in the live database, and, based on the change record being of the first type, determining that the exported database includes a row of data indicated by the change record as inserted into the live database, and marking the change record as applied based on determining that the exported database includes the row of data indicated by the change record as inserted, or based on the change record being of the third type, determining that a pre-modified version of a row of data at the live database fails to match a corresponding row of data at the exported database and that a post-modified version of the row of data at the live database matches the corresponding row of data; and marking the change record as applied based on the pre-modified version of the row of data failing to match the corresponding row of data and the post-modified version of the row of data matching the corresponding row of data.

Some examples of the method, apparatuses, and non-transitory computer-readable medium described herein may further include operations, features, means, or instructions for determining, based on obtaining the portion of the log, that a change record of one or more change records in the portion of the log may be unapplied to the exported database, where determining that the exported database failed to capture the one or more transactions may be based on determining that the change record may be unapplied.

In some examples of the method, apparatuses, and non-transitory computer-readable medium described herein, operations, features, means, or instructions for determining that the change record may be unapplied to the exported database may include operations, features, means, or instructions for determining that the change record may be one of a first type for inserting data into the live database, a second type for deleting data from the live database, or a third type for modifying data in the live database, and, based on the change record being of the first type, determining that the exported database lacks a row of data indicated by the change record as inserted into the live database, or, based on the change record being of the second type, determining that the exported database includes a row of data indicated by the change record as deleted from the live database, or, based on the change record being of the third type, determining that a pre-modified version of a row of data at the live database matches a corresponding row of data at the exported database, or determining that the pre-modified version of the row of data and a post-modified version of the row of data at the live database fails to match the corresponding row of data at the exported database.

Some examples of the method, apparatuses, and non-transitory computer-readable medium described herein may further include operations, features, means, or instructions for applying, to the exported database, the change record based on determining that the change record may be unapplied to the exported database, where applying the change record includes, based on the change record being of the second type, deleting, from the exported database, the row of data indicated by the change record as deleted, and marking the change record as applied based on deleting the row of data indicated by the change record as deleted, or based on the change record being of the third type, deleting the corresponding row of data at the exported database that matches the pre-modified version of the row of data at the live database, and marking the change record as applied based on deleting the corresponding row of data at the exported database.

Some examples of the method, apparatuses, and non-transitory computer-readable medium described herein may further include operations, features, means, or instructions for determining that the change record may be included in a set of change records of the one or more change records, the set of change records used to perform a sequence of dependent operations, determining that a second change record of the set of change records may be applied to the exported database, the second change record occurring later in the sequence than the change record, and marking the change record as applied based on determining the second change record may be applied to the exported database.

Some examples of the method, apparatuses, and non-transitory computer-readable medium described herein may further include operations, features, means, or instructions for saving, to the file, the change record based on determining that the change record may be unapplied to the exported database and failing to apply the change record to the exported database and processing a first set of change records saved to the file in accordance with the first set of change records, where the first set of change records includes the change record, and where the file represents the updated database based on the first set of change records saved to the exported database and a second set of change records applied to the exported database.

Some examples of the method, apparatuses, and non-transitory computer-readable medium described herein may further include operations, features, means, or instructions for determining that a change record associated with the one or more transactions committed to the live database may be associated with a table of the exported database, loading, into a cuckoo filter, the change record and a first portion of the table, receiving, from the cuckoo filter, an indication that the change record matches a row in the first portion of the table, scanning each row in the first portion of the table to identify the row in the first portion of the table, determining, based on the scanning, that the change record fails to match any rows in the first portion of the table, loading, into the cuckoo filter based on determining that the change record fails to match any rows in the first portion of the table, the change record and a second portion of the table, receiving, from the cuckoo filter, an indication that the change record fails to match any rows in the second portion of the table, and loading, into the cuckoo filter based on the cuckoo filter indicating that the change record fails to match any rows in the second portion of the table, the change record and a third portion of the table without scanning the second portion of the table.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method at a first computing system, comprising:
    saving, to a file, a representation of an exported database, wherein the representation is based at least in part on a live database being exported from a second computing system via an export operation that spans a time period;
    determining, based at least in part on the live database being exported, that one or more transactions were committed to the live database during the time period;
    obtaining, from the second computing system based at least in part on determining that the one or more transactions were committed to the live database during the time period, a portion of a log indicating the one or more transactions committed to the live database during the time period;
    determining, based at least in part on the log, whether the exported database captured the one or more transactions committed to the live database; and
    updating the file to represent an updated database that reflects an updated version of the live database based at least in part on determining that the exported database failed to capture the one or more transactions committed to the live database, wherein the updated database reflects an application of the one or more transactions committed to the live database to the exported database.

2. The method of claim 1, further comprising:
    transmitting, to the second computing system, a message to initiate a change tracking operation for generating the log over a second time period that comprises the time period.

3. The method of claim 1, further comprising:
    transmitting, to the second computing system at a first time that precedes or corresponds to a beginning of the export operation, a first message requesting a first index corresponding to a most recent entry in the log as of the first time;
    receiving, from the second computing system, the first index in response to the first message;
    transmitting, to the second computing system at a second time that corresponds to an end of the export operation, a second message requesting a second index corresponding to a most recent entry in the log as of the second time; and
    receiving, from the second computing system, the second index in response to the second message.

4. The method of claim 3, further comprising:
    comparing the first index and the second index, the first index corresponding to a first transaction committed to the live database prior to the export operation, and the second index corresponding to a second transaction of the one or more transactions committed to the live database during the export operation; and
    determining, based at least in part on the comparing, that the second index is different than the first index,
    wherein the one or more transactions are determined as being committed to the live database during the time period based at least in part on the second index being different than the first index.

5. The method of claim 1, further comprising:
    transmitting, to the second computing system based at least in part on determining that the one or more transactions were committed to the live database during the time period, a message requesting the portion of the log corresponding to the time period,
    wherein obtaining the portion of the log comprises receiving the portion of the log in response to the message, the portion of the log comprising one or more change records indicating one or more operations applied to the live database during the time period to commit the one or more transactions to the live database during the time period.

6. The method of claim 5, wherein:
    the message comprises a first index of a most recent entry in the log as of a first time that precedes or corresponds to a beginning of the export operation and requesting a second index of a most recent entry in the log as of a second time that corresponds to an end of the export operation, and obtaining the portion of the log comprises receiving one or more entries of the log having indices subsequent to the first index and equal to or preceding the second index.

7. The method of claim 6, wherein:

the one or more entries correspond to one or more respective transactions committed to the live database during the time period spanned by the export operation, and the portion of the log further comprises, for the one or more entries, one or more respective change records of the one or more change records indicating a respective set of operations performed to execute a corresponding transaction of the one or more transactions.

8. The method of claim 5, wherein:

the live database comprises a plurality of tables, and the portion of the log indicates, for individual tables of the plurality of tables to which changes were applied during the time period, a respective set of change records of the one or more change records recorded during the time period for the table.

9. The method of claim 5, further comprising:

arranging the one or more change records in an order in which corresponding operations were applied to the live database.

10. The method of claim 1, further comprising:

determining, based at least in part on obtaining the portion of the log, that a change record of one or more change records in the portion of the log is applied to the exported database, wherein determining that the change record is applied to the exported database comprises:

determining that the change record is one of a first type for inserting data into the live database, a second type for deleting data from the live database, or a third type for modifying data in the live database; and based at least in part on the change record being of the first type:

determining that the exported database includes a row of data indicated by the change record as inserted into the live database, and marking the change record as applied based at least in part on determining that the exported database includes the row of data indicated by the change record as inserted; or based at least in part on the change record being of the third type:

determining that a pre-modified version of a row of data at the live database fails to match a corresponding row of data at the exported database and that a post-modified version of the row of data at the live database matches the corresponding row of data; and marking the change record as applied based at least in part on the pre-modified version of the row of data failing to match the corresponding row of data and the post-modified version of the row of data matching the corresponding row of data.

11. The method of claim 1, further comprising:

determining, based at least in part on obtaining the portion of the log, that a change record of one or more change records in the portion of the log is unapplied to the exported database, wherein determining that the exported database failed to capture the one or more transactions is based at least in part on determining that the change record is unapplied.

12. The method of claim 11, wherein determining that the change record is unapplied to the exported database comprises:

determining that the change record is one of a first type for inserting data into the live database, a second type for deleting data from the live database, or a third type for modifying data in the live database; and based at least in part on the change record being of the first type, determining that the exported database lacks a row of data indicated by the change record as inserted into the live database; or based at least in part on the change record being of the second type, determining that the exported database includes a row of data indicated by the change record as deleted from the live database; or based at least in part on the change record being of the third type:

determining that a pre-modified version of a row of data at the live database matches a corresponding row of data at the exported database, or determining that the pre-modified version of the row of data and a post-modified version of the row of data at the live database fails to match the corresponding row of data at the exported database.

13. The method of claim 12, further comprising:

applying, to the exported database, the change record based at least in part on determining that the change record is unapplied to the exported database, wherein applying the change record comprises:

based at least in part on the change record being of the second type:

deleting, from the exported database, the row of data indicated by the change record as deleted, and marking the change record as applied based at least in part on deleting the row of data indicated by the change record as deleted; or based at least in part on the change record being of the third type:

deleting the corresponding row of data at the exported database that matches the pre-modified version of the row of data at the live database, and marking the change record as applied based at least in part on deleting the corresponding row of data at the exported database.

14. The method of claim 11, further comprising:

determining that the change record is included in a set of change records of the one or more change records, the set of change records used to perform a sequence of dependent operations;

determining that a second change record of the set of change records is applied to the exported database, the second change record occurring later in the sequence than the change record; and marking the change record as applied based at least in part on determining the second change record is applied to the exported database.

15. The method of claim 11, further comprising:

saving, to the file, the change record based at least in part on determining that the change record is unapplied to the exported database and failing to apply the change record to the exported database; and processing a first set of change records saved to the file in accordance with the first set of change records, wherein the first set of change records comprises the change record, and wherein the file represents the updated database based at least in part on the first set of change records saved to the exported database and a second set of change records applied to the exported database.

16. The method of claim 1, further comprising:
determining that a change record associated with the one or more transactions committed to the live database is associated with a table of the exported database;
loading, into a cuckoo filter, the change record and a first portion of the table;
receiving, from the cuckoo filter, an indication that the change record matches a row in the first portion of the table;
scanning each row in the first portion of the table to identify the row in the first portion of the table;
determining, based at least in part on the scanning, that the change record fails to match any rows in the first portion of the table;
loading, into the cuckoo filter based at least in part on determining that the change record fails to match any rows in the first portion of the table, the change record and a second portion of the table;
receiving, from the cuckoo filter, an indication that the change record fails to match any rows in the second portion of the table; and
loading, into the cuckoo filter based at least in part on the cuckoo filter indicating that the change record fails to match any rows in the second portion of the table, the change record and a third portion of the table without scanning the second portion of the table.

17. A first computing system, comprising:
memory, and
a processor coupled with the memory and configured to cause the first computing system to:
save, to a file, a representation of an exported database, wherein the representation is based at least in part on a live database being exported from a second computing system via an export operation that spans a time period;
determine, based at least in part on the live database being exported, that one or more transactions were committed to the live database during the time period;
obtain, from the second computing system based at least in part on determining that the one or more transactions were committed to the live database during the time period, a portion of a log indicating the one or more transactions committed to the live database during the time period;
determine whether the exported database captured the one or more transactions committed to the live database; and
update the file to represent an updated database that reflects an updated version of the live database based at least in part on determining that the exported database failed to capture the one or more transactions committed to the live database, wherein the updated database reflects an application of the one or more transactions committed to the live database to the exported database.

18. The first computing system of claim 17, wherein the processor is further configured to cause the first computing system to:
transmit, to the second computing system at a first time that precedes or corresponds to a beginning of the export operation, a first message requesting a first index corresponding to a most recent entry in the log as of the first time;
receiving, from the second computing system, the first index in response to the first message;
transmit, to the second computing system at a second time that corresponds to an end of the export operation, a second message requesting a second index corresponding to a most recent entry in the log as of the second time; and
receive, from the second computing system, the second index in response to the second message.

19. The first computing system of claim 18, wherein the processor is further configured to cause the first computing system to:
compare the first index and the second index, the first index corresponding to a first transaction committed to the live database prior to the export operation, and the second index corresponding to a second transaction of the one or more transactions committed to the live database during the export operation; and
determine, based at least in part on the comparing, that the second index is different than the first index,
wherein the one or more transactions are determined as being committed to the live database during the time period based at least in part on the second index being different than the first index.

20. A non-transitory, computer-readable medium comprising instructions which, when executed by a processor of a first computing system, cause the first computing system to:
save, to a file, a representation of an exported database, wherein the representation is based at least in part on a live database being exported from a second computing system via an export operation that spans a time period;
determine, based at least in part on the live database being exported, that one or more transactions were committed to the live database during the time period;
obtain, from the second computing system based at least in part on determining that the one or more transactions were committed to the live database during the time period, a portion of a log indicating the one or more transactions committed to the live database during the time period;
determine whether the exported database captured the one or more transactions committed to the live database; and
update the file to represent an updated database that reflects an updated version of the live database based at least in part on determining that the exported database failed to capture the one or more transactions committed to the live database, wherein the updated database reflects an application of the one or more transactions committed to the live database to the exported database.

* * * * *